(12) United States Patent
Swarr et al.

(10) Patent No.: US 12,301,380 B2
(45) Date of Patent: May 13, 2025

(54) APL FIELD SWITCH WITH AUTOMATIC PROTOCOL DETECTION

(71) Applicant: PHOENIX CONTACT DEVELOPMENT AND MANUFACTURING, INC., Middletown, PA (US)

(72) Inventors: Lonnel J. Swarr, Manheim, PA (US); David N. Katz, Hummelstown, PA (US); Davis Mathews, Lewisberry, PA (US); Brian John Gillespie, Mount Joy, PA (US); Brenton E. Helfrick, Harrisburg, PA (US); Scott Michael Frye, Palmyra, PA (US); Jason Alan Norris, Stow, OH (US)

(73) Assignee: Phoenix Contact Development and Manufacturing, Inc., Middletown, PA (US)

(*) Notice: Subject to any disclaimer, the term of this patent is extended or adjusted under 35 U.S.C. 154(b) by 188 days.

(21) Appl. No.: 17/917,839

(22) PCT Filed: Feb. 23, 2022

(86) PCT No.: PCT/US2022/017536
§ 371 (c)(1),
(2) Date: Oct. 7, 2022

(87) PCT Pub. No.: WO2022/182771
PCT Pub. Date: Sep. 1, 2022

(65) Prior Publication Data
US 2023/0318875 A1     Oct. 5, 2023

Related U.S. Application Data

(60) Provisional application No. 63/152,435, filed on Feb. 23, 2021, provisional application No. 63/152,438, filed on Feb. 23, 2021.

(51) Int. Cl.
*H04L 12/40* (2006.01)
*G06F 13/38* (2006.01)
(Continued)

(52) U.S. Cl.
CPC ...... *H04L 12/40169* (2013.01); *G06F 13/382* (2013.01); *G06F 13/4282* (2013.01); *H04L 43/18* (2013.01); *G06F 2213/0042* (2013.01)

(58) Field of Classification Search
None
See application file for complete search history.

(56) References Cited

U.S. PATENT DOCUMENTS

| 5,706,007 A | 1/1998 | Fragnito et al. |
|---|---|---|
| 6,259,706 B1 | 7/2001 | Shimada |

(Continued)

FOREIGN PATENT DOCUMENTS

| CN | 107517225 A | 12/2017 |
|---|---|---|
| DE | 102016125169 A1 | 6/2018 |

(Continued)

OTHER PUBLICATIONS

European Patent Office, Written Opinion of the International Searching Authority in corresponding PCT/US2022/017536, Jul. 18, 2022, 18 pages.

(Continued)

*Primary Examiner* — June Sison
(74) *Attorney, Agent, or Firm* — Hooker & Habib, P.C.

(57) ABSTRACT

Protocol detection circuits for detecting the field device protocol of a field device attached to a channel having a data line are sequentially connected to the data line by a controller that communicates to the field device through the protocol detection circuits. The protocol detection circuits are disconnected from the field device after protocol detection is completed. The channel may be one of a number of (Continued)

channels; the controller may also connect and disconnect the protocol detection circuits from the one channel whereby the protocol detection circuits can be used with any channel. After the protocol of the field device is identified a protocol adapter can be inserted into the channel to enable data conversion between the field device protocol and an another protocol used by the channel for data transmission.

37 Claims, 18 Drawing Sheets

(51) Int. Cl.
*G06F 13/42* (2006.01)
*H04L 43/18* (2022.01)

(56) References Cited

U.S. PATENT DOCUMENTS

| | | |
|---|---|---|
| 8,266,308 B2 | 9/2012 | Rydberg et al. |
| 8,582,581 B2 | 11/2013 | Llett |
| 9,024,486 B2 | 5/2015 | Wehrle et al. |
| 9,634,858 B2 | 4/2017 | Reller |
| 9,762,409 B2 | 9/2017 | Ringkamp et al. |
| 9,798,690 B2 | 10/2017 | Sakamoto |
| 10,320,584 B2 | 6/2019 | Sotriffer et al. |
| 10,481,627 B2 | 11/2019 | Butikofer et al. |
| 10,739,745 B1 | 8/2020 | Kretschmann |
| 2013/0208724 A1 | 8/2013 | Collucci et al. |
| 2015/0127876 A1 | 5/2015 | Erni et al. |
| 2019/0102335 A1 | 4/2019 | Tan et al. |
| 2020/0011480 A1 | 1/2020 | Patel |
| 2020/0076204 A1 | 3/2020 | Chen et al. |
| 2020/0106864 A1 | 4/2020 | Denison et al. |
| 2020/0201296 A1 | 6/2020 | Mayer et al. |
| 2021/0044677 A1 | 2/2021 | Toriumi et al. |
| 2021/0081346 A1 | 3/2021 | Nixon et al. |
| 2021/0185846 A1* | 6/2021 | Katz ................... G01R 1/206 |
| 2023/0123088 A1 | 4/2023 | Müller |
| 2024/0056320 A1* | 2/2024 | Swarr ................... H04L 12/10 |
| 2024/0205041 A1* | 6/2024 | Schnaare ........... G05B 19/4185 |
| 2024/0264585 A1* | 8/2024 | Peterson ............ G05B 19/0425 |
| 2024/0267241 A1* | 8/2024 | Diaz ................... H04L 12/10 |

FOREIGN PATENT DOCUMENTS

| | | |
|---|---|---|
| JP | H11127215 A | 5/1995 |
| JP | 2004080127 A | 3/2004 |
| JP | 2013110904 A | 6/2013 |
| WO | 200442674 | 5/2004 |
| WO | 2020011480 A1 | 1/2020 |
| WO | 2022069034 A1 | 4/2022 |

OTHER PUBLICATIONS

European Patent Office, Machine Translation into English of specification of DE102016125169A1, Oct. 7, 2022, 5 pages.
European Patent Office, Machine Translation into English of specification of WO200442674A1, Oct. 7, 2022, 27 pages.
European Patent Office, Machine Translation into English of specification of CN107517225A, Oct. 7, 2022, 25 pages.
Japanese Patent Office, Office Action dated Sep. 24, 2024 in corresponding patent application JP2023-548852,.
English-language translation of Japanese Patent Office, Office Action dated Sep. 24, 2024 in corresponding patent application JP2023-548852.
European Patent Office, Machine language English translation of JP2013110904A, 12 pages.
European Patent Office, Machine language English translation of JP2004080127A, 13 pages.

* cited by examiner

APL FIELD SWITCH WITH AUTOMATIC PROTOCOL DETECTION

RELATED APPLICATIONS

This application claims priority to and the benefit of the filing dates of U.S. Patent Application 63/152,435 filed Feb. 23, 2021 and entitled "APL Field Switch with Automatic Protocol Detection" and U.S. Patent Application 63/152,438 filed Feb. 23, 2021 entitled "APL Field Switch with Integrated Protocol Detection", which priority applications were on the filing date of this application and are each incorporated by reference as if fully set forth herein.

FIELD OF THE DISCLOSURE

The disclosure relates generally to field switches for use in process control networks, and in particular, APL field switches.

BACKGROUND OF THE DISCLOSURE

The Ethernet Advanced Physical Layer (APL) specification is based on an industry standard (IEEE 802.3cg) for the physical layer for an Ethernet based, two-wire process control network. An APL network enables data rates of up to 10 Megabits per second (Mbps) full duplex to and from APL-compatible field devices for long transmission distances. APL field devices include sensors, actuators, and the like required for operation of a sophisticated process control network.

APL field devices are typically connected to APL field switches. An APL field switch typically has between 8 to 24 channels that connect to APL field devices. The APL field switch channels transfer power to the connected APL field devices and transfer data between the APL field devices and the process control network. An example of a commercially available 24-channel APL field switch is the FIELDCONNEX® ARS11-B2-IC24-1 APL field switch sold by Pepperl+Fuchs GmbH, Mannheim, Germany Because of the advantages offered by APL networks, many industries are installing APL networks (that include APL field switches) when building new process control infrastructure. But APL field devices are still not readily available. Those building new infrastructure must rely at least partially on legacy, non-APL field devices. An upgrade pathway from legacy field devices to APL field devices is desirable. The pathway should enable legacy field devices to be connected to APL field switches while allowing replacement of those legacy field devices with APL field devices as they become available.

Industries with existing process control networks often must expand their network infrastructure. Investing in additional legacy field devices may not be desirable, but replacing legacy field devices with APL field devices may also not be desirable given the cost to remove field devices in hard-to-reach locations that are still in good operating condition. An expansion that enables use of legacy field devices alongside APL field devices may be the desired solution, a solution that still provides an upgrade pathway from legacy field devices to APL field devices.

There is a need therefore for an APL field switch with channels that enable connection of both APL field devices and legacy non-APL field devices. But legacy non-APL field devices do not use the same field device protocols (data and power specifications) as do APL field devices. It is necessary that the APL field switch do protocol conversion between APL and non-APL protocols if legacy field devices can operate in an APL process control network while connected to the network through an APL field switch.

One solution is an APL field switch containing the onboard hardware and software that supports any legacy non-APL protocol on any channel. But the list of legacy protocols is long. This solution is cost-prohibitive and customers must pay for hardware that they may not ever use.

Another solution is an APL field switch containing onboard hardware to software that supports a small subset of non-APL protocols. But this greatly limits the number of legacy field devices that can be attached to the APL field switch.

Yet another solution is an APL field switch containing onboard hardware and software on just a few fixed channels. But this makes it difficult to order the correct number of APL field devices or to order APL field devices with the correct number of fixed channels. The opportunity for installation mistakes attaching a that a field device—legacy or APL to the wrong channel also increase.

A further alternative solution is an APL field switch that supports only one non-APL protocol. For example, the FIELDCONNEX® ARS11-B2-IC24-1 APL field switch can be used with PROFIBUS PA field devices. But this does not provide the flexibility needed for many new and existing process control infrastructures.

Thus, there is a need for an APL field switch that enables legacy non-APL field devices having many different legacy field device protocols to be reliably attached to any channel of the APL field switch in a cost-efficient manner.

SUMMARY OF THE DISCLOSURE

Disclosed is an APL field switch that enables legacy non-APL field devices having many different legacy field device protocols to be reliably attached to any channel of the APL field switch in a cost-efficient manner.

The solution is to place protocol conversion in a pluggable protocol adapter that is inserted into an APL field device channel to convert between the APL protocol and the attached legacy field device protocol. Different protocol adapters can be installed in any of the channels of the APL field device.

A wide range of protocol adapters can be made available supporting a wide range of legacy field device protocols, providing the flexibility needed for many new and existing process control infrastructures.

By purchasing protocol adapters based on the customer's needs, a customer only incurs costs for those legacy field devices that are connected to the APL field switch and they pay only for the protocols they need. Some protocols require expensive support circuitry; providing such circuitry for each channel makes purchase of the APL field switch expensive whether the customer will use that circuitry or not. With protocol adapters, customers do not purchase expensive circuitry if it is not needed.

Protocol adapters enable customers to easily make changes to the network. Protocol adapters can be swapped when changing from one legacy field device to another or whenever infrastructure requirements change.

APL field switches in accordance with this disclosure include a protocol adapter connector in each channel. Plugging a protocol adapter into a protocol adapter connector places the protocol adapter in series in the channel. The protocol adapter is capable of transferring power through the protocol adapter to power an attached field device and to translate data formats between APL and legacy data formats for network communications. The protocol adapter can include expensive legacy circuitry for high-speed data communications with the attached field device in the legacy data format.

Installers can land legacy field devices on any available channel of the APL field switch and install a compatible protocol adapter in that channel. Channels connected to APL field devices do not require a protocol adapter; the channel is itself compatible with the APL protocol. If all the connected field devices are APL field devices, there is no need to purchase protocol adapters. The APL field device then provides insurance in being capable of connecting to legacy field devices if ever needed but the cost of acquiring that capability by using protocol adapters will not be incurred if the need never arises.

It can be difficult to identify the protocol used by a legacy field device, and therefore difficult to know which protocol adapter to use for a given legacy field device.

Also disclosed herein are protocol detection circuits that enable automatic detection of the protocol used by a field device (whether an APL field device or a legacy field device). Each protocol detection circuit is dedicated to detecting a respective field device protocol or compatible family of protocols.

A controller sequentially connects each protocol detection circuit to the attached field device and communicates with the field device until the protocol is detected or the controller fails to detect the protocol after trying each protection detection circuit. Because field device communications during protocol detection do not have to be high-speed communications, protocol detection circuits can eliminate expensive circuitry needed for high-speed data communications.

Because the protocol of the attached field device is not known, it is important to limit initial power transmission to a safe current or amperage. A safe current is a low enough current that will not cause a field device terminator resistor to dissipate power above its maximum rating. Each channel includes a selectably-adjustable current-limiting device that is connected to and controlled by the controller. The controller initially sets the current-limiting device to a safe current state before initiating protocol detection. If the detected protocol allows for higher power transmission, the controller sets the current-limiting device to a corresponding current state.

Once protocol detection is completed, the name of the detected protocol or the failure to detect a protocol is displayed to a user. The user selects the protocol adapter to use based on the detected protocol.

In embodiments of the disclosed APL field switch, the APL field switch includes the protocol detection circuits, the controller, and selectable current-limiting devices in each channel. When a field device is first attached to a channel, the controller sets the channel's current-limiting device to a safe current stat3e and initiates protocol detection. The controller connects to the channel itself when detecting whether the field device is an APL field device. The controller sequentially connects the protocol detection circuits to the channel to connect the protocol detection circuits to the attached field device.

When a channel is attached to an APL field device, the controller can be configured to enable dynamic power allocation of the channel to a user-selectable APL Power Class.

A single set of protocol detection circuits can be used with any channel to which a field device is attached. It is not necessary to provide multiple copies of the set, one for each channel. APL field switch hardware costs are reduced while still allowing legacy field devices to be attached to any channel of the APL field switch.

In yet other embodiments of the disclosed APL field switch, the APL field switch does not include the protocol detection circuits. A portable handheld protocol detection tool can be used instead to automatically detect the protocol of a field device attached to the protocol detection tool. The protocol detection tool includes an APL channel, the protocol detection circuits, and the controller. The field device is attached to the APL channel and the controller initiates protocol detection and conducts protocol detection as previously described above. The tool can be battery powered or powered through an AC adapter.

Other objects and features of the disclosure will become apparent as the description proceeds, especially when taken in conjunction with the accompanying drawing sheets illustrating one or more illustrative embodiments.

DETAILED DESCRIPTION

Figure 1:
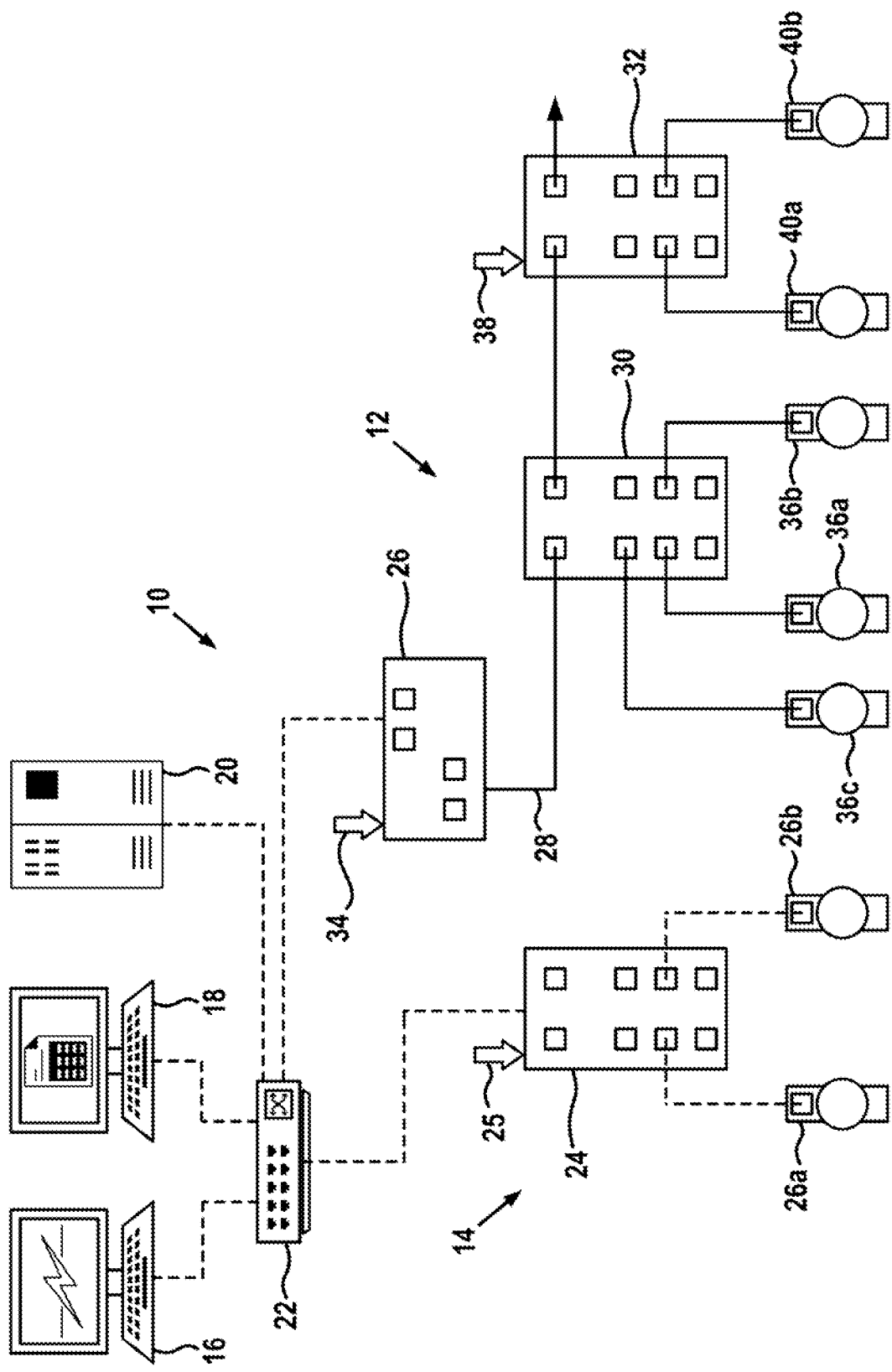
FIG. 1 illustrates a process control network including an APL field switch in accordance with this disclosure.

FIG. 1 illustrates a process control network 10 made up of a 10 Mbps Ethernet-APL process control network 12 and a 100 Mbps Industrial Ethernet process control network 14.

The APL-Ethernet process control network 12 conforms to the Ethernet Advanced Physical Layer (APL) specification. The APL-Ethernet network 12 uses two-wire trunk and two-wire spur cabling for simultaneous data transmission and power transmission over the two wires. The trunk and spurs of the APL-Ethernet process control network 12 are shown in solid lines in FIG. 1.

The illustrated Industrial Ethernet process control network 14 is an EtherNet/IP (Ethernet Industrial Protocol network). The Industrial Ethernet network 14 uses standard Ethernet CAT 5 or better Ethernet cable (referred to herein as "standard Ethernet cable") and associated hardware that is also commonly used in business Ethernet LAN networks. Standard Ethernet cables are shown in broken lines in FIG. 1.

The process control network 10 includes a backend having an engineering station 16, an operations station 18, a process controller 20, and a backend non-APL Ethernet switch 22. The backend stations, process controller, and Ethernet switch are connected by standard CAT 5 or better Ethernet cables for high speed Ethernet communications (100 Mbps or greater).

The Industrial Ethernet network 14 includes a non-APL Ethernet switch 24 connected to the backend Ethernet switch 22 by a standard CAT 5 or better Ethernet cable. The Industrial Ethernet switch 24 is powered by an auxiliary power supply represented by the arrow 25. The Industrial Ethernet switch 24 is connected to a non-APL field device 26a and a non-APL field device 26b by standard CAT 5 or better Ethernet cables. The field device 26a and field device 26b are powered by auxiliary power supplies and not through the network. The back end can communicate with the field devices 26a, 26b through the backend Ethernet switch 22 and the Industrial Ethernet switch 24.

The APL-Ethernet network 12 includes an APL power switch 26 connected to an APL trunk 28 that extends from the APL power switch to a downstream APL field switch 30, and then to a further downstream APL field switch 32. The APL power switch 26 receives power from an auxiliary DC power source represented by the arrow 34. The APL power switch 26 injects power into the APL trunk for the simultaneous transmission of power and data through the trunk.

The APL power switch 26 is connected for data transmission to the backend Ethernet switch 22 through a standard Ethernet CAT 5 or better cable. The APL power switch 26 converts between the 100 Mbps Ethernet transmitted through the standard Ethernet cable to the 10 Mbps Ethernet transmitted through APL-Ethernet two-wire cable to provide data communications between the APL-Ethernet network 12 and the back end Ethernet switch 22.

The APL field switch 30 is shown connected to the network trunk 28 and can transmit power received from the network trunk to field devices attached to the APL field switch. The APL field switch 30 is connected to a field device 36a, a field device 36b, and a field device 36c by respective two-wire APL-compatible spurs extending from ports of the APL field switch. The APL field switch 32 transmits data to and from the field devices 36 and can deliver power to the field devices 36 received through the network trunk 28.

The APL field switch 32 is shown connected to an auxiliary power source represented by the arrow 38. The APL field switch 32 is not powered from the trunk 28 but receives and transmits data through the APL trunk 28. The APL field switch 32 as shown in FIG. 1 is connected to a field device 40a and a field device 40b by respective two-wire APL-compatible spurs extending from ports of the APL field switch. The APL field switch 32 transmits data to and from the field devices 40 and can deliver power to the field devices 40 received through the auxiliary power source 38.

The field devices 26, 36, 40 are sensors, actuators, and the like compatible with the field switches to which they are connected. The field devices output sensor data, operating status, command confirmations, diagnostics, and other outgoing network communications required for operation of the process control network 10 and/or are configured to receive commands, data requests, and other incoming network communications required for operation of the process control network 10.

As the two APL field switches shown in FIG. 1 are identical, only the APL field switch 30 will be discussed in detail.

The APL field switch 30 is connected to an APL field device 36a and to legacy non-APL field devices 36b and 36c. The APL field switch 30 is configured to operatively connect to APL field devices by attaching an APL spur from the APL field switch to the field device. The APL field switch 30 has internal protocol detection circuitry (shown and described in more detail below) that includes a controller that detects whether or not an APL field device has been attached to the field switch.

If an APL field device is detected, no further user-configuration is required. The port transfers data to and from the APL field device and delivers power through the port to the APL field device in accordance with the APL specification.

If the protocol detection controller detects that the attached field device is not an APL field device, the controller sequentially connects the field device to a number of respective protocol detection circuits that can each identify a respective non-APL network protocol if used by the non-APL field device. The protocol detection controller informs the user of the detected non-APL protocol, or of the failure to detect a protocol.

If a non-APL protocol is detected, the user utilizes a protocol adapter compatible with the detected protocol. The protocol adapter is placed in series with the port. The protocol adapter converts data between the APL data protocol and the field device data protocol to enable data transmission between the field device and the network trunk or other data terminals of the APL field switch.

The protocol adapter can also transmit power received into the APL field switch 30 through the protocol adapter and to the port for power transmission to the field device.

Not all field device protocols, however, are "data and power protocols" that require both data transmission and power transmission. Some field device protocols are "data only" protocols without power transmission to the field device. Protocol adapters for "data only" protocols do not allow electrical power transfer through the protocol adapter while allowing data transfer through the protocol adapter.

The protocol detection circuitry also incorporates power circuitry that enables the controller to selectively adjust the maximum power that can be transmitted through the port while detecting the field device protocol. The physical layer specifications of different network protocols specify different power requirements (including a power requirement of zero), and may specify the field device have a termination resistor for proper network operation. The controller sets an initial current to the field device at the start of protocol detection that prevents the resistor from dissipating power above its maximum power rating.

The field device 36b is a PROFIBUS PA field device. The PROFIBUS PA protocol is a power-and-data protocol. Other power-and-data protocols include, but are not limited to, the APL protocol and the Foundation Fieldbus protocol. The field device 36c is a MODBUS RTU field device 36b. The MODBUS RTU protocol is a data-only protocol. Another data-only protocol is, but is not limited to, DP (Profibus DP). The illustrated APL field switch 30 includes PROFIBUS PA and MODBUS RTU protocol detection circuits. A removable PROFIBUS PA protocol adapter and a removable MODBUS RTU protocol adapter are installed in the APL field switch 30 and are connected to the PROFUS PA field device 36b and to the MODBUS RTU field device 36c respectively.

Figure 2:
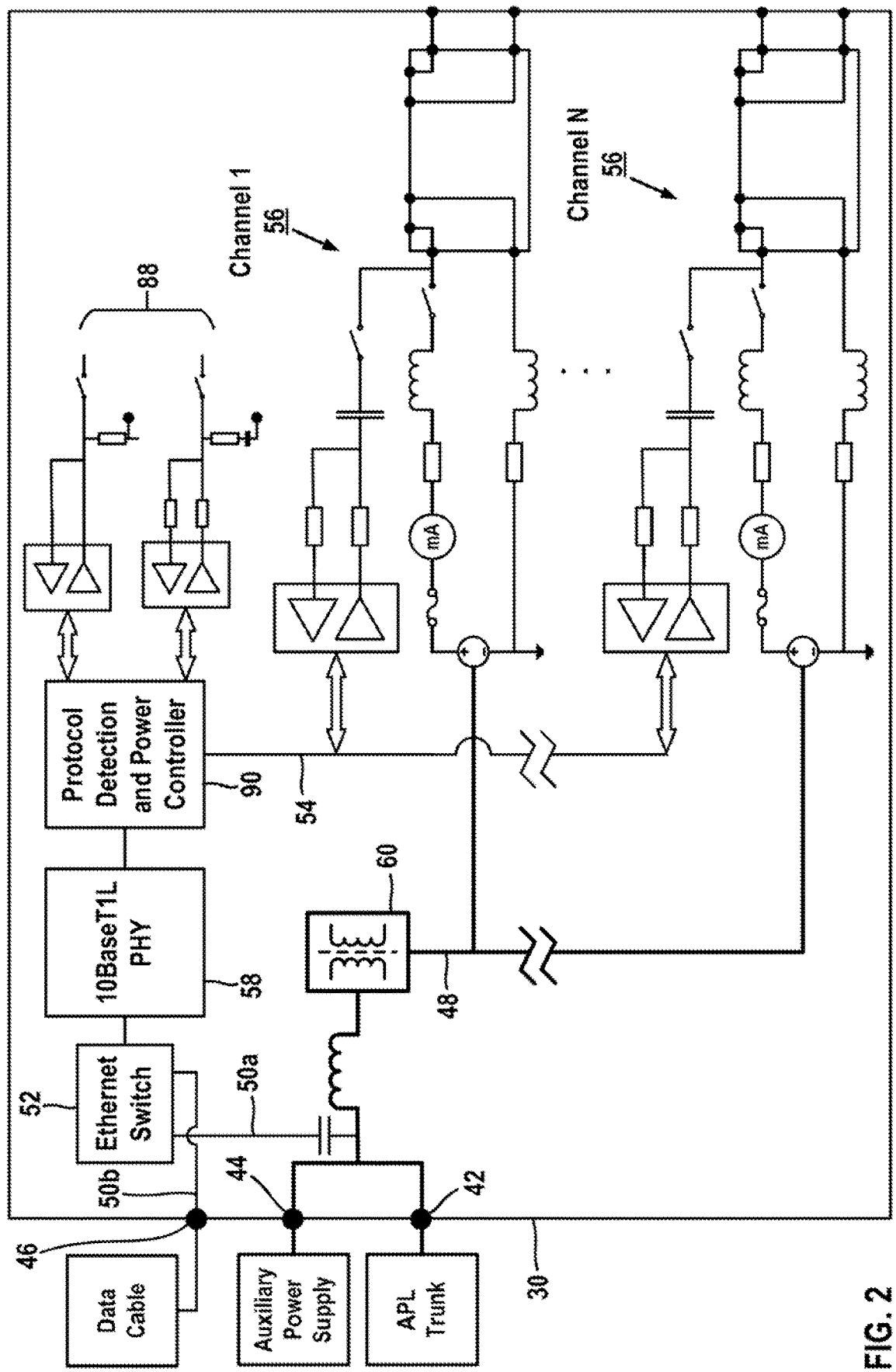
FIG. 2 illustrates an APL field switch in accordance with this disclosure.

FIG. 2 schematically illustrates components of the APL field switch 30. The APL field switch has trunk terminals 42 for connecting the field switch to an APL trunk 28 and external power supply terminals 44 for connecting the field switch to an auxiliary power supply (like the auxiliary power supply 38). The illustrated APL field switch 30 also includes one or more dedicated data ports 46 that transmit data, and not power, into and out of the APL field switch 30. A dedicated data port 46 can be realized as an Ethernet RJ45 connector, an SFP optical connector, or the like for connection to a compatible external optical or electrical data cable.

When the APL field switch is powered by the APL trunk connected to the trunk terminals 42, the trunk terminals 42 function both as power terminals that receive power into the APL field switch and data terminals that transmit data between the APL trunk and the APL field switch. When the APL field switch is powered by an external power source connected to the external power supply terminals 37, the external power supply terminals 44 function as power terminals that receive power into the APL field switch, and the trunk terminals 42 function as data terminals that transmit data between the APL trunk and the APL field switch. Each dedicated data terminal 46 functions only as a data terminal that transmits data into and out of the APL field switch 30.

Power received through the power terminals 42, 44 are received into the APL field switch 30 through a power line 48 connected to the terminals 42, 44. The power line 48 also transmits data into the APL field switch through the trunk terminals 42 and transmits data out of the APL field switch through the trunk terminals 42. A data line 50a extends between the power line 50 and one end of an Ethernet switch 52. The data line 50a extracts data from the power line 48 received through the trunk terminals 42 and transits the data to the Ethernet switch 52, and injects data received from the Ethernet switch 52 into the power line 48 for transmittal out through the trunk terminals 42. A data line 50b extends between each data terminal 46 and the one end of the Ethernet switch 52 for data transmission into and out of data terminals 46. The Ethernet switch 52 in turn has data lines represented as the data line 54 extending from the other end of the Ethernet switch to transmit data between the Ethernet switch and connected field devices.

The power line 48 and the data line 54 extend to a number N of like channels 56 that extend in parallel from the power line 50 and the data line 54 to respective ports of the APL field switch 30. The channels 56 may be galvanically isolated from the power line 48 and from each other.

Disposed in the data line 54 between the channels 56 and the combined power/data line 56 is a 10BaseT1L Ethernet physical layer transceiver 58. The transceiver 58 enables communication of Ethernet-formatted data frames between the channels 56 and the combined power/data line 50. Disposed in the power line 48 ahead of the channels 56 is an isolated switching power supply 60 that electrically isolates the channels 56 from the power terminals.

Figure 3:
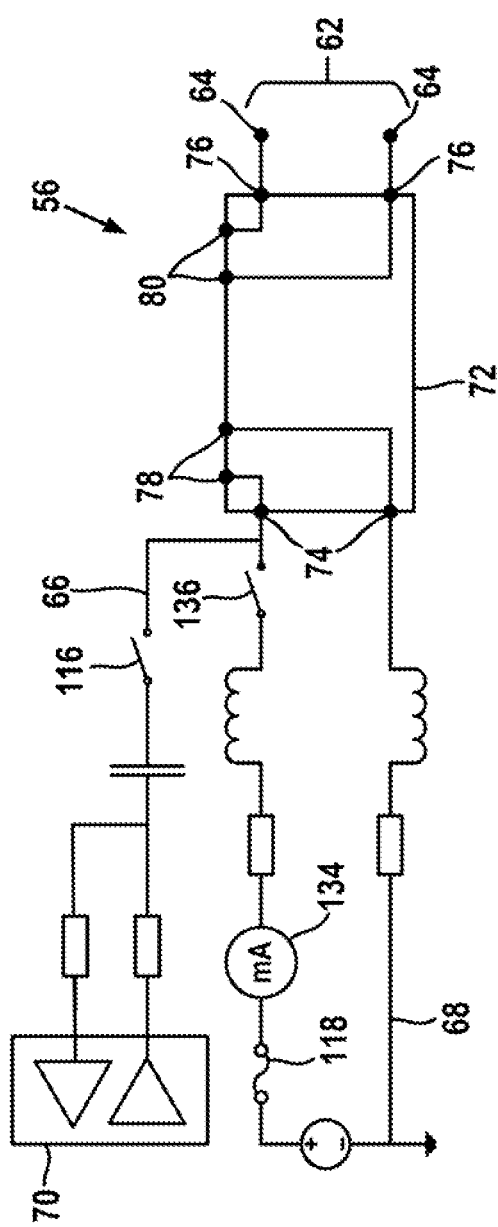
FIG. 3 is an enlarged view of a channel of the APL field switch shown in FIG. 2, the protocol adapter connector of the channel not connected to a matching connector.

FIG. 2 illustrates two of the N channels 56, and FIG. 3 is an enlarged view of a channel 56. The channel 56 transmits data and power between the power line 48 and the data line 54 and a port 62. Each channel's port 62 has port terminals 64 configured as a two-wire Ethernet-compatible port connector. The port terminals 64 may in alternative embodiments be configured as a screw or clamping terminal, an M12 connector, or other connector compatible with the APL specification. Different styles or types of port terminals 64 may be provided by the APL field switch manufacturer, and a port 62 may include multiple types of port terminals 64 provided in parallel for greater connection flexibility in connecting a field device to an APL field switch port.

The channel 56 includes a channel data line 66 being one of the data lines 54 and a channel power line 68. The end of the channel data line 66 away from the Ethernet switch 52 is connected to and extends from the channel power line 68. The channel data line 66 extracts data from the channel power line 68 transmitted through the port 62 and injects data into the channel power line 68 transmitted from the Ethernet switch 52. The channel data line 66 includes an APL-compatible transceiver 70 that receives and transmits Ethernet data frames from and to the Ethernet switch 52.

The channel power line 68 is formed as a two-wire line connected to and extending from the power line 50 to the port terminals 64. The channel data line 66 connects to the channel power line 68 before the channel power line connects to the port terminals 64. The port terminals 64 then can transmit power out of the port 62 and can receive and transmit data through the port 62.

The channel data line 66 and the channel power line 68 include conventional circuit components that enable separation and merger of power and data, intrinsic safety, overvoltage protection, isolation, and the like. Transmission of power and data frames through a channel 56 is conventional except that the channel 56 includes features that enable automatic protocol detection of a field device, operative connection of a non-APL field device to the channel port 62 using a protocol adapter, and dynamic setting of the maximum power that can be transmitted through the channel 56 as set out in further detail below.

As best seen in FIG. 3, a channel 56 includes a protocol adapter connector 72 formed as an electrical connector disposed in series in the channel power line 68 between the channel data line 66 and the port terminals 62. The protocol adapter connector is used to insert a protocol adapter (described din more detail later below) into the channel power line 68. The protocol adapter connector 72 has terminals 74 and terminals 76 that connect the connector 72 to the channel power line. The protocol adapter connector 72 has connector terminals 78 and terminals 80 connected to the power terminals 74, 76 respectively that are configured to cooperate with corresponding terminals of a protocol adapter to electrically connect the protocol adapter in series in the channel power line 68.

Figure 4:
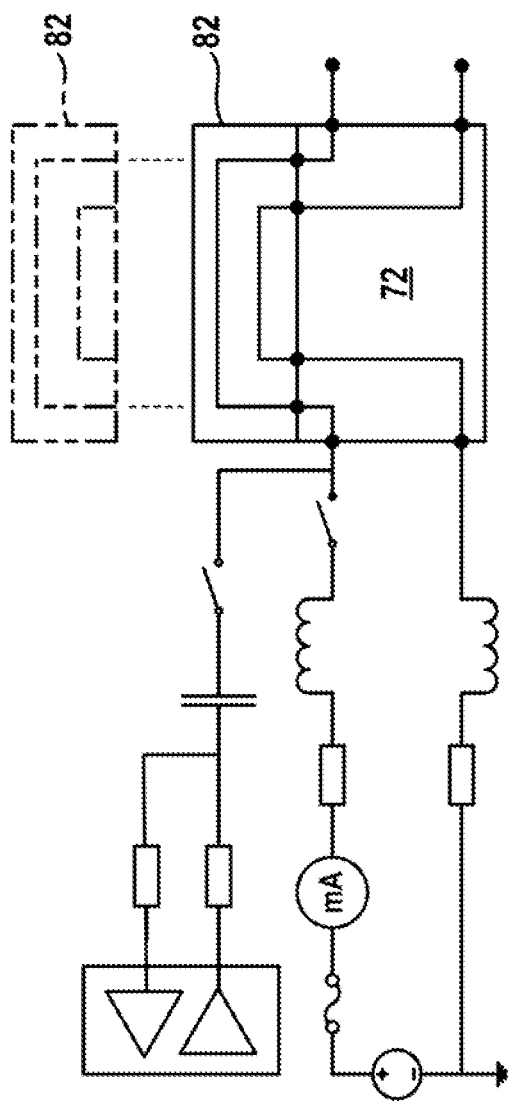
FIG. 4 is similar to FIG. 3 but illustrates a pass-through connector attached to the protocol adapter connector.

As shown in FIG. 3, the protocol adapter connector 72 normally opens the channel power line 68 and prevents transmission of power and data through the channel 56. When an APL field device is connected to the port 62, there is no need to use a protocol adapter. In such a case, a pass-through connector 82 formed as an electrical connector compatible with the protocol adapter connector 72 is attached to the protocol adapter connector 72. See FIG. 4. The pass-through connector 82 provides circuit continuity across the protocol adapter connector 72.

When a field device is first attached to a channel port 62, the pass-through connector 82 must be attached to the protocol adapter connector 72 for continuity across the protocol adapter connector 72 when detecting the protocol of the field device.

Figure 5:
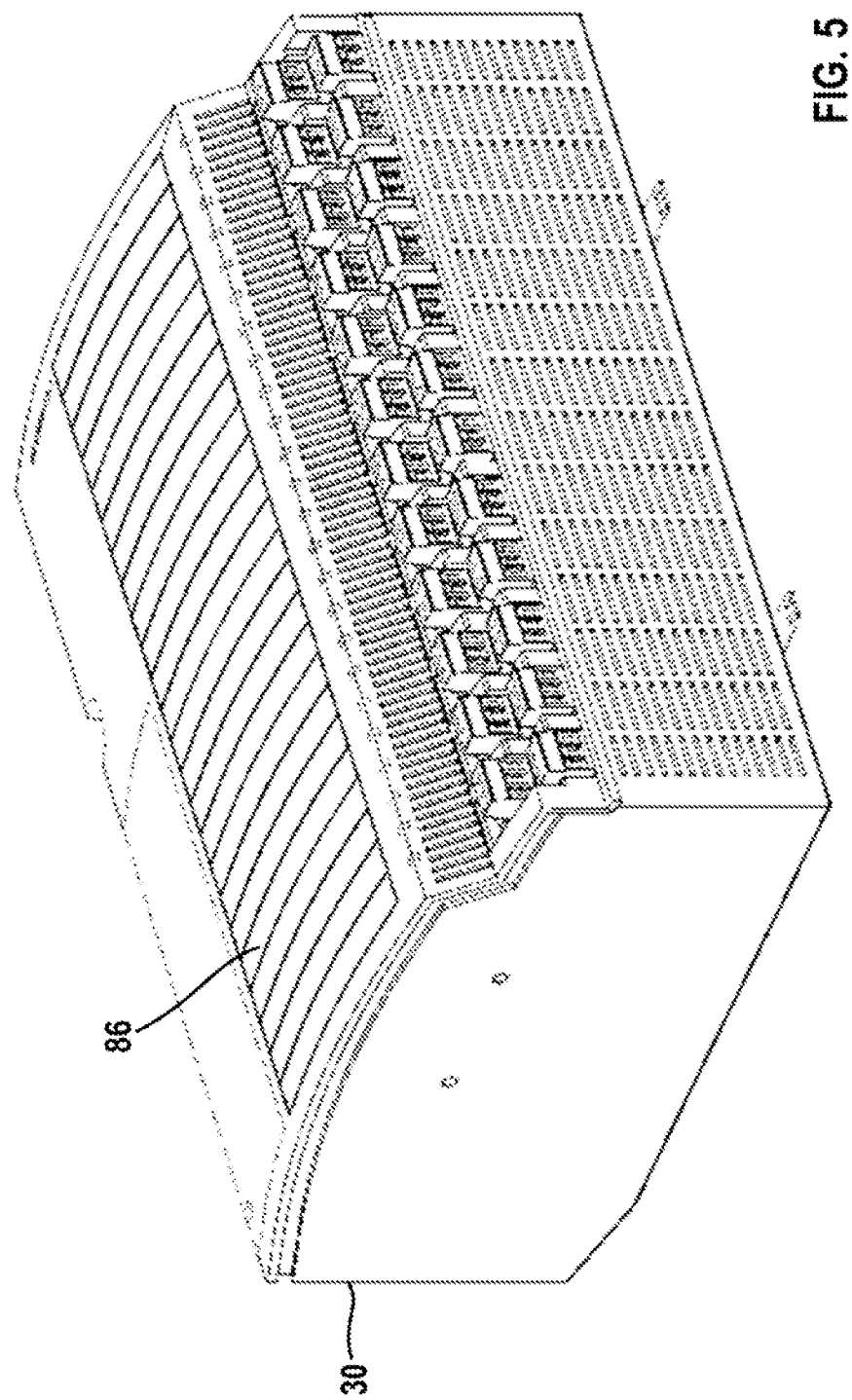
FIG. 5 is a perspective view of the outside of the APL field switch of FIG. 2 illustrating removable covers disposed over the protocol adapter, each cover forming part of a pass-through connector.

FIG. 5 is a view of the outside of the APL field switch 30. Each port 62 has an associated open slot 84 (see FIG. 19) that provides access to the protocol adapter connector 72 connected to the port 62. When a protocol adapter is not installed in the slot (when, for example, an APL field device is connected to the port) the slot is closed by a cover 86. FIG. 5 illustrates covers 86 closing all the slots. In the illustrated APL field switch embodiment, each cover 86 incorporates two conductors forming part of a respective pass-through connector 82 in series with the protocol adapter connecter terminals 78, 80. When a cover is in place, the cover assures electrical continuity across the protocol adapter connector 72 in the slot closed by the cover.

In other possible cover embodiments, the cover 86 is itself non-conductive but has a pass-through connector 82 connected to the cover. Closing a slot with a cover installs the pass-through connector into the protocol adapter connector 72.

Referring back to FIG. 2, the APL field switch 30 includes a protocol detection module 88 containing protocol detection circuitry (shown in more detail in FIG. 6) that enables automatic protocol detection of a newly attached field device to a port. The protocol detection circuitry includes a controller 90 that operates the protocol detection circuitry to detect and identify the field device protocol. The controller 90 includes a microprocessor or central processing unit (CPU) 92 that issues commands to the protocol detection circuitry and receives data from the protocol detection circuitry. The CPU 90 has read/write access to storage or memory 94 that holds application software made of executable instructions 96 executable by the CPU 92 to perform controller functions and the data processed by those functions. The memory 94 may be persistent memory such as EEROM memory or other types of non-volatile memory used in embedded systems and may include volatile memory. Battery power may be provided to maintain volatile memory in case of power failure.

The controller 90 may in possible embodiments be realized as a system on a chip (SoC) that may include the microcontroller along with other peripherals needed to perform the controller functions.

The controller 90 is disposed in the data line 54 between the transceiver 58 and the channels 56. The controller 90 can read data from the data line 54 and can transmit data to the data line 54.

The controller 90 is also connected to a communications line 98 used to inform a user of the detected field device protocol (or the failure to detect a field device protocol). A display 100 represents informing the user of the detected field device protocol. A display 100 may be placed on the APL field switch 30 itself or may be separate from the APL field switch. The communication line 98 may, as non-limiting examples, take the form of one or more of: a Bluetooth wireless connection to a smartphone or the like, a wired connection such as a serial USB cable or Ethernet cable that connects to the controller, and/or through APL data terminal(s) 42, 48 via the data line 54. The controller 90 may be configured to be seen as a field device on the process control network to communicate through the process control network.

The protocol detection circuitry 88 further includes a number of respective protocol detection circuits 102 connected to the controller 90. The illustrated APL field switch 30 has two protocol detection circuits, but a manufacturer may also provide APL field switches with only one protocol detection circuit 102 or with more than two protocol detection circuits 102 depending on how many types of legacy non-APL field devices are to be supported by the APL field switch.

Each protocol detection circuit 102 is configured for detecting a respective set of one or more compatible non-APL field device protocols. For example, protocol detection 102*a* is configured to detect the DP/MODBUS RTU field device "data-only" protocols. The protocol detection circuit 102*b* is configured to detect PROFIBUS PA/FOUNDATION FIELDBUS "power-and-data" protocols. An APL field switch 30 could be provided with a set of one or more data-only protocol detection circuits, a set of one or more power-and-data protocol detection circuits, or a set each of data-only protocol detection circuits and power-and-data protocol detection circuits.

The protocol detection circuits 102 can be selectively connected to each channel 56 for protocol detection of a field device attached to the channel port as explained in more detail below. In this way individual non-APL protocol detection circuits 102 can be used with all the channels 56 without the need for dedicated, per-channel, protocol detection circuits.

A description of a protocol detection circuit 102 is given next. A protocol detection circuit 102 includes a data line 104 and a transceiver 106 connected to the data line 104 conforming to the physical layer of the protocol(s) associated with the protocol detection circuit. When attempting to determine whether a field device utilizes the device protocol associated with the protocol detection circuit, the controller 90 attempts to communicate with the field device using that protocol. The controller attempts to communicate using the transceiver 106 and, if successful, receives and transmits data to and from the field device through the transceiver. For example, a fieldbus field device will not respond until it receives a command. The controller 90 sends a command to the field device to initiate communication and, if it receives a response from the field device, can determine whether the field device uses that protocol.

In the illustrated embodiment, when a field device is first attached to a channel port 62, the controller 90 first determines whether or not the field device is an APL field device. If the controller determines the field device is not an APL field device, the controller sequentially connects the field device to the protocol detection circuits 102 until the field device protocol is identified or the controller has attempted detection with all of the protocol detection circuits 102. The controller may determine the field device is a data-only field device and iterate only through the data-only protocol circuits. Similarly, the controller may iterate through the power-and-data protocol circuits only if the field device is identified as a power-and-data field device.

Figure 6:
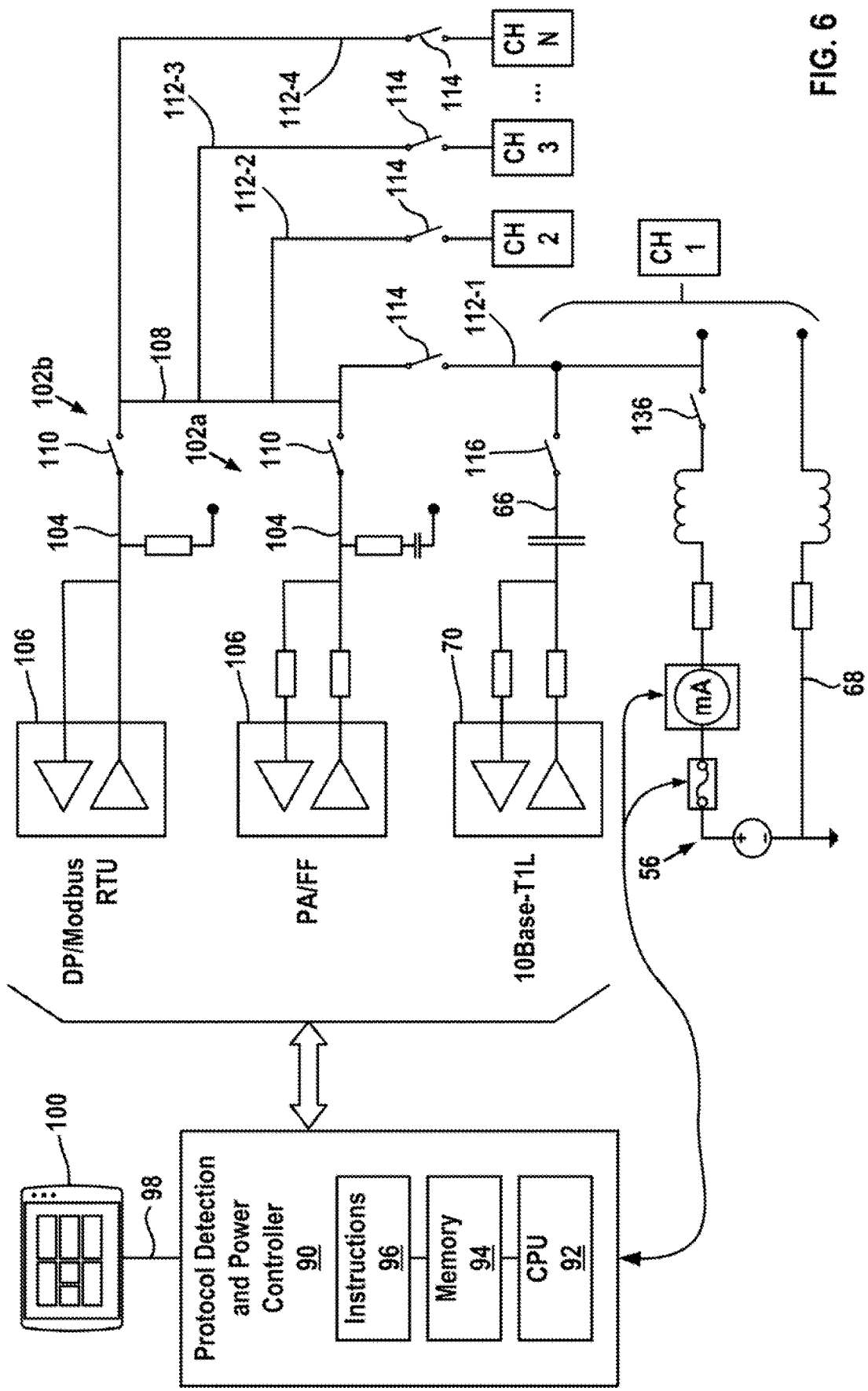
FIG. 6 is a schematic view of the automatic protocol detection circuitry of the APL field switch shown in FIG. 2 and the connections of the protocol detection and power controller to each channel of the APL field switch.

As shown in FIG. 6, the data lines 104 of the protocol detection circuits 102 are connected in parallel to a common data line 108. Disposed in each data line 104 is a relay 110 connected to and controlled by the controller 90. The relay 110 selectively connects and disconnects the data line 104 from the common signal line 108. When the relay 110 is open, the protocol detection circuit 102 is effectively electrically isolated from the other protocol detection circuits, and is effectively electrically isolated from all the channels 56.

The protocol detection circuit relay 110 is closed only while the protocol detection circuit 102 is actively being used by the controller 90 for protocol detection.

Extending in parallel from the common signal line 108 are respective channel protocol detection data lines 112, each channel protocol detection data line 112 connected to a respective channel 56. FIG. 6 illustrates the channel protocol detection data line 112-1 connected to the channel data line 69 of Channel 1. The other channel protocol data lines 112-2-112-N connect to the data lines 69 of their respective channels 2-N in the same way.

Disposed in each channel protocol detection data line 112 is a protocol detection data relay 114 connected to and controlled by the controller 90. The relay 114 selectively connects and disconnects the channel protocol detection data line 112 from the common signal line 108. When a relay 114 is open, the protocol detection data line 112 cannot be connected to any of the protocol adapters 102. In addition, the channel 56 connected to the protocol detection data line 112 is electrically isolated from the other channels 56.

The channel protocol detection data relay 114 connected to a channel 56 is closed only while protocol detection circuits 102 are in use to detect the device protocol of a field device attached to the channel 56. Closing a protocol detection circuit relay 110 connects the channel 56 to the protocol detection circuit containing the relay 110.

As previously mentioned when a field device is attached to a channel port 62, the controller 90 first determines whether or not the field device is an APL field device. The port's channel 56 is used as a protocol detection circuit when the controller 90 is determining whether the attached field device is an APL field device. The controller 90 attempts to communicate with the field device through the channel transceiver 70 via the data line 54. FIG. 6 schematically illustrates the Channel 1 transceiver 60 connected for communication with the controller 90; it should be understood that the controller 90 can communicate with each channel transceiver 70.

Each channel 56 includes a relay 116 in the channel data line 66 that is connected to and controlled by the controller 90. When a channel 56 is actively being used to detect the device protocol of a field device attached to the channel 56, the channel data relay 116 is closed for data communication between the controller 90 and the field device. Because the protocol detection circuit relays 110 and the channel protocol detection relays 114 are all open, all data communication between the controller 90 and the attached field device must pass through the channel data line 66 and the channel transceiver 70.

If the controller 90 determines the field device attached to a channel port 62 is an APL field device, the channel data relay 116 remains closed for data communications between the data line 54 and the channel port 62 through the closed relay 116.

When a field device is first connected to a channel port 62 of a channel 56, the field device is connected to the channel power line 68. Because the device protocol has not yet been determined, it is important that the current being delivered to the field device at connection is low enough to prevent a terminator in the field device from dissipating power above its maximum power rating. For example, PROFIBUS DB or MODBUS RTU field devices have lower maximum power ratings than do PA/FOUNDATION FIELDBUS field devices. In other words, at connection the maximum current that can flow through the channel 56 must be limited to the extent necessary that the maximum power output that can be transmitted through the channel 56 does not exceed a minimum safe power output that would not harm the field device attached to the channel port 62.

The protocol detection circuitry 88 includes each channel 56 having an inline, selectable current-limiting device 118 disposed in the channel power line 68. A current-limiting device placed in a circuit activates should the current exceed a predetermined maximum current flow (amperage), thereby interrupting the circuit and stopping current flow or otherwise reducing or maintaining circuit current flow to a safe level. The current-limiting device limits the maximum flow of electrical current through the channel port 62.

Known types of selectably adjustable current-limiting devices that can be adapted for use with the present disclosure include, but are not limited to:
  an eFuse connected to a selectable resistance;
  a constant current limiting circuit;
  a foldback current limiting circuit; and
  a parallel resettable fuse arrangement of different amperage ratings arranged in series with relays that select which fuse is active.

An eFuse is an all-electronic, selectable-current-limiting fuse that when actuated stops current flow.

Figure 7:
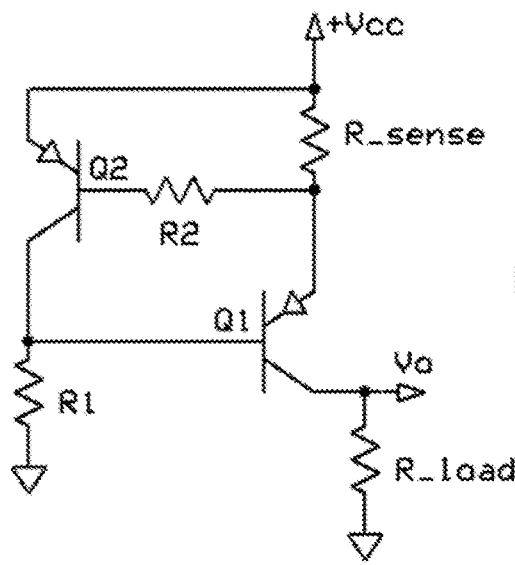
FIG. 7 is a schematic view of a constant current limiting circuit.

Constant current limiting circuits enable current to pass through until a maximum current is reached. The circuit then lowers the voltage to prevent current flow to exceed the maximum current flow. FIG. 7 illustrates an exemplar constant current-limiting circuit that can be adapted for use with the present disclosure.

Figure 8:
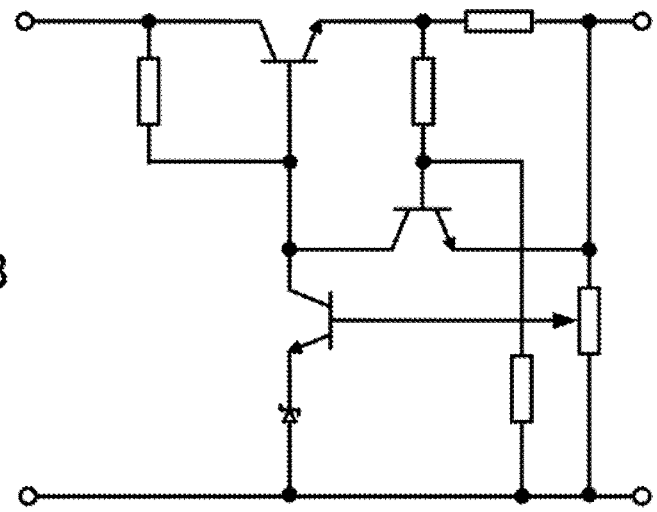
FIG. 8 is a schematic view of a foldback current limiting circuit.

Foldback current limiting circuits enable current to pass through until a maximum current is reached. The circuit lowers the voltage and current to prevent current flow from exceeding the maximum current flow. FIG. 8 illustrates an exemplar foldback current limiting circuit that can be adapted for use with the present disclosure. Image attribution: By Mikiemike at English Wikipedia, CC BY-SA 3.0, https://commons.wikimedia.org/w/index.php?curid=70852656.

Current limiting circuits utilize resistors to set the maximum current flow through the circuit. By utilizing variable-resistance resistors that enable dynamic selection of resistance in the design of these circuits, the maximum current flow through a circuit and hence the maximum power output of the circuit can be selected by selecting the resistance of the resistor.

Current limiting circuits can also be connected in series with a static switch driver such as the LTC7003 driver available from Analog Devices, Wilmington, Massachusetts, USA 01887 that enables sensing a relatively large voltage drop.

Figure 9:
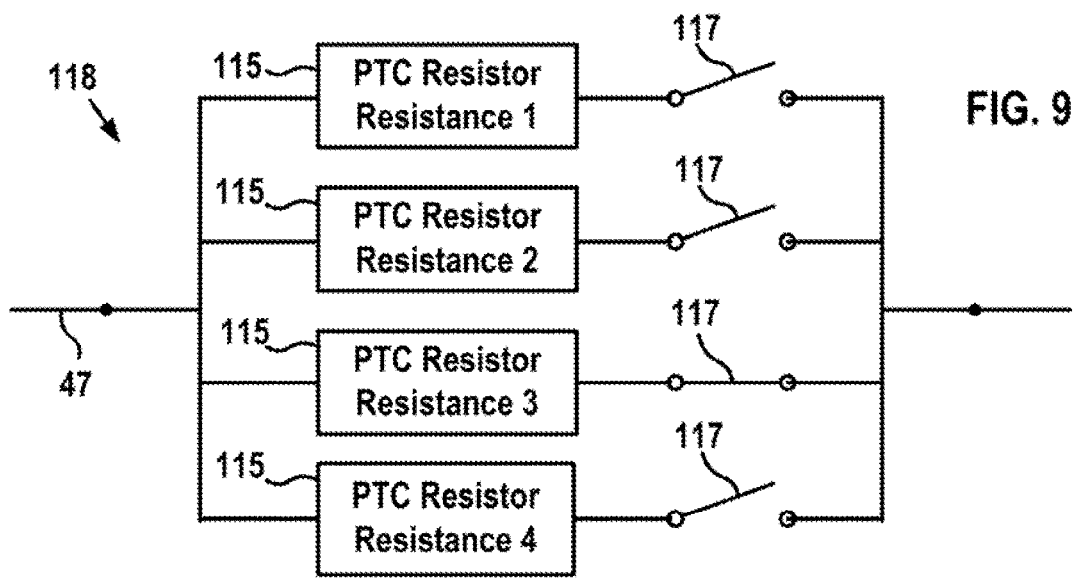
FIG. 9 is a schematic view of a parallel resettable fuse arrangement.

FIG. 9 illustrates a selectable current-limiting device 118 formed as a parallel fuse arrangement that includes Positive Temperature Coefficient (PTC) resettable fuses that can automatically reopen after cooling. PTC fuses that may be adapted for use in accordance with this disclosure may be obtained from Eaton, Electronics Division, Cleveland, Ohio USA. The fuses 115 are each arranged in series with a relay 117 connected to and controlled by the controller 68. Closing a relay and keeping the other relays open enables the controller 90 to selectably insert a selected one of the fuses 115 in the channel power line 68.

In the illustrated embodiment the selectable-current-limiting device 118 includes an electronic fuse or eFuse. An eFuse is an example of an all-electronic, selectable-current-limiting fuse that, when actuated if the current exceeds a predetermined amperage, stops current flow through the channel 56. The eFuse does not depend on thermal heating and the subsequent open circuit of an inline element to stop current flow, reacts quickly, and can be reset easily.

The eFuse is attached to a digital potentiometer that has selectable resistance. The resistance of the digital potentiometer sets the current limit that will open the eFuse. In turn, the maximum power that can be transmitted through the channel 56 is determined by the current limit that will open the eFuse.

The controller 90 is connected to each current limiting device 118. When the field device is initially attached to the channel port 62, the controller 90 sets the maximum power output of the channel 56 by setting the resistance of the potentiometer to a resistance that limits the maximum channel power output to not greater than the minimum safe power output.

Figure 10:
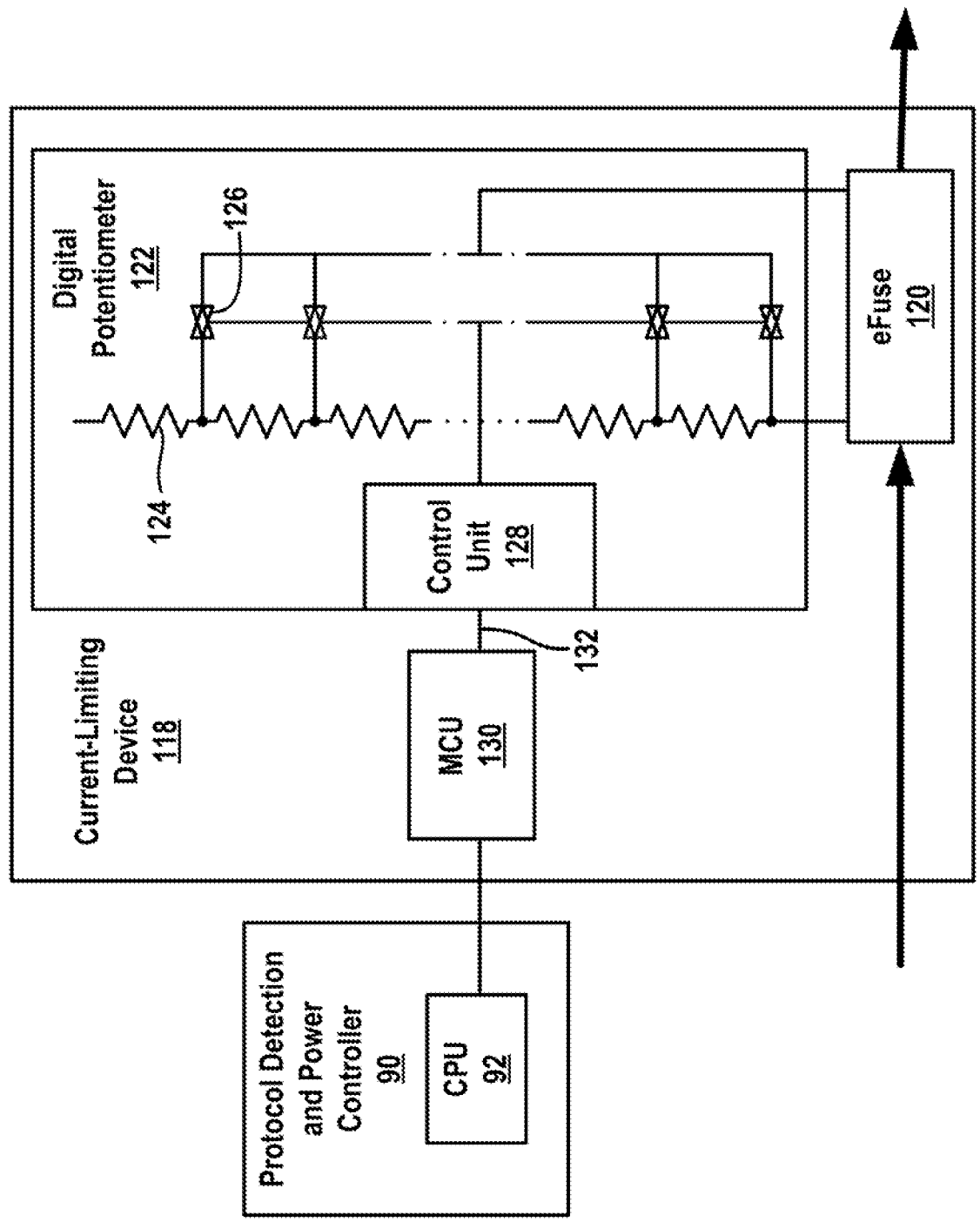
FIG. 10 is schematic view of an embodiment of a current-limiting device attached to the controller, the current-limiting device including a digital fuse (eFuse) attached to a digital potentiometer.

FIG. 10 illustrates an embodiment of the selectable current-limiting device 118 disposed in a channel power line 68. The current-limiting device 118 includes an eFuse 120. The eFuse 120 is in line with the channel power line 68 such that current flowing through the channel power line 68 must flow through the eFuse 120. The eFuse 120 enables a resistor to be connected to the eFuse 120 that sets the current limit that will open the eFuse. Connecting a variable-resistance resistor to the eFuse 120 enables the current limit to be selectively changed based on the selected resistance of the variable-resistance resistor.

Efuses offer many advantages for controlling current flow. Efuses are available commercially as integrated circuit packages from Texas Instruments, Toshiba, STMicroelectronics, and other vendors. An eFuse should be selected based on amperage and voltage capacity, response speed, energy efficiency, and the like.

The eFuse 120 is attached to a digital potentiometer 122 that functions to enable setting different current limits to open the eFuse. Digital potentiometer integrated circuits are available from Analog Devices Inc., Microchip, Texas Instruments, and other suppliers.

The illustrated digital potentiometer 122 includes a resistor ladder 124 and an electronic switch 126 at each step of the ladder. In operation, one switch 126 is closed at a given time to determine the effective resistance of the digital potentiometer (similar to the action of a wiper of a conventional analog potentiometer).

The operating state of the set of switches 126 is controlled by a control unit 128 of the digital potentiometer that can receive commands from the controller 90 to set the resistance of the digital potentiometer. Digital potentiometers with control units compatible for connection to the controller 90 through I2C and SPI serial networks are commercially available.

The digital potentiometer 122 enables the resistance that sets the eFuse current limit to be selectively changed to open the eFuse at different maximum current flows and hence different maximum power outputs. When the field device is initially attached to the channel port 62, the controller 90 sets the maximum power output of the channel 56 by setting the resistance of the potentiometer 122 to a resistance that limits the maximum channel power output to not greater than the minimum safe power output.

Figure 11:
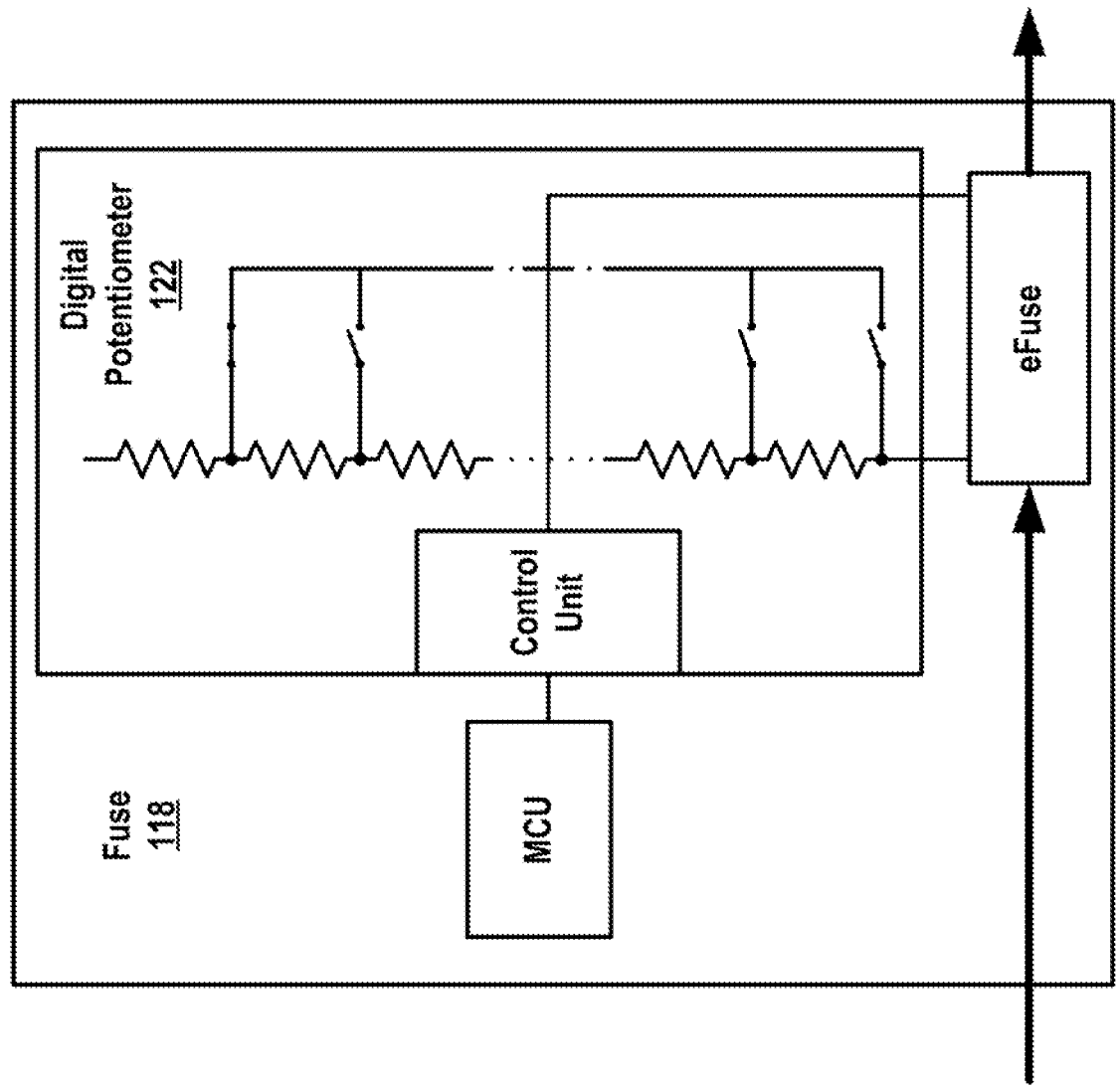
FIG. 11 is a view of the current-limiting device shown in FIG. 10 in a first, lower power state.

FIG. 11 illustrates the eFuse 120 with the digital potentiometer 122 set to a relatively high resistance suitable for setting a channel 56 to a lower maximum power output. A lower current flow through the eFuse 120 opens the eFuse.

FIG. 9 illustrates the eFuse 120 with the digital potentiometer 122 set to a relatively low resistance suitable for setting a channel 56 to a higher maximum power output. A higher current flow through the eFuse 120 opens the eFuse.

Referring back to FIG. 10, the illustrated current-limiting device 118 includes a microprocessor or MCU 130 that is connected to the control unit 128 by a UART circuit 132. The MCU 130 communicates with the control unit 128 whereby the control unit 128 sets the desired resistance of the digital potentiometer 122.

The MCU is connected to the controller 90 by an I2C network (not shown). The controller 90 has data applicable to the digital potentiometer 122 that enables the controller to command the MCU to set the potentiometer resistance to the desired resistance. The controller 90 can individually address each channel MCU 130 and is capable of directing the MCU 130 to set the desired resistance of the connected digital potentiometer 122 and thereby establish the maximum power output of each channel 56.

Figure 13:
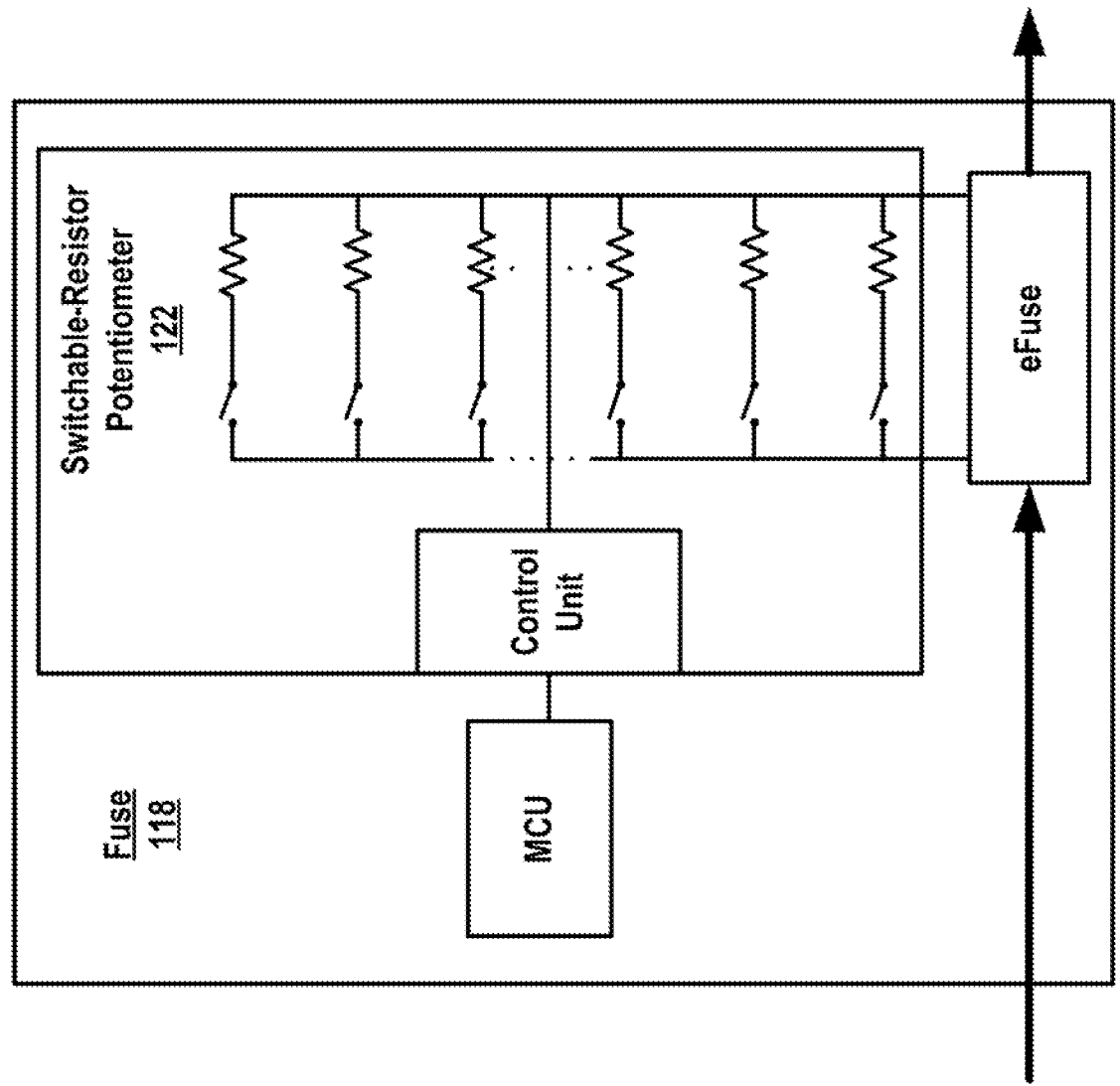
FIG. 13 is a schematic view of a second embodiment current-limiting device.

FIG. 13 illustrates a switchable-resistor type of digital potentiometer 122 that can be used in place of the ladder-type digital potentiometer 122. The switchable-resistor digital potentiometer 122 replaces the resistor ladder 124 with a number of parallel resistors, each resistor in series with a respective programmable switch. The resistors can vary in values of resistance. Each switch can be selectively opened or closed by the control unit 128 to obtain the desired resistance.

After the controller 90 identifies the device protocol of an attached field device, the maximum power output of the channel 56 transmitting power to the field device can be increased to the maximum power set by the protocol. The controller 90 adjusts the selectable current-limiting device 118 as described to increase the maximum power output of the channel 56 from the minimum safe power output to the protocol power output.

If the attached field device is an APL field device, the controller 90 can also be configured to enable a user to selectively set the APL Power Class of the port 62 transmitting power to the field device. The APL standard defines multiple Power Classes that can be applied to each port of an APL field switch.

Use of selectable-current-limiting devices to selectively set APL field switch Power Classes is disclosed in the applicant's co-pending PCT patent application number PCT/US2022/017477 filed with the United States Patent and Trademark Office as Receiving Office on even date herewith and entitled "APL Field Switch with Dynamic Power Allocation", which co-pending application was published as International Publication No. WO 2022/182727A and is incorporated by reference as if fully set forth herein.

The protocol detection circuitry 88 further includes a current meter 134 disposed in each channel 56 see FIG. 3), each current meter connected as in input to the controller 90.

Commercially available integrated circuit Hall-effect current sensors, for example, can be adapted for use in accordance with this disclosure.

If a data-only field device is attached to the channel 56, there is no need for the channel 56 to deliver power to the field device during protocol detection or normal operation of the field device. Each channel 56 includes a power relay 136 disposed in the channel power line 68 connected to and controlled by the controller 90. The channel data line 66 is between the channel power relay 136 and the channel port 62. Data can be transmitted through the channel data line regardless of the power relay 136 being open or closed.

When a field device is first attached to a channel port 62, the channel power relay 136 is closed and the channel 56 can deliver a minimum safe power to the field device. The controller 90 reads the channel current meter 134 to detect whether the field device is drawing power through the channel 56. This assists the controller in determining whether or not the field device is a data-only field device (no current, so no power draw) or is a power-and-data field device (current draw, so power draw).

If the controller 90 detects the field device is a data-only field device, the controller opens the channel power relay 136 so that power is not transmitted through the channel 56 to the field device. The controller 90 has determined the field device is a non-APL field device (the APL protocol being a power-and-data protocol) and so the field device only has to be connected to data-only protocol detection circuits 102 associated with data-only protocols for protocol detection.

If the controller 90 detects the field device is drawing power and that the field device is a data-and-power field device, the channel power relay 136 remains closed so that power is transmitted to the field device during protocol detection and during normal operation of the field device. The controller first attempts to detect the APL protocol, and if that is unsuccessful, connects the field device only to protocol detection circuits 102 associated with data-and-power protocols for protocol detection.

Figure 14:
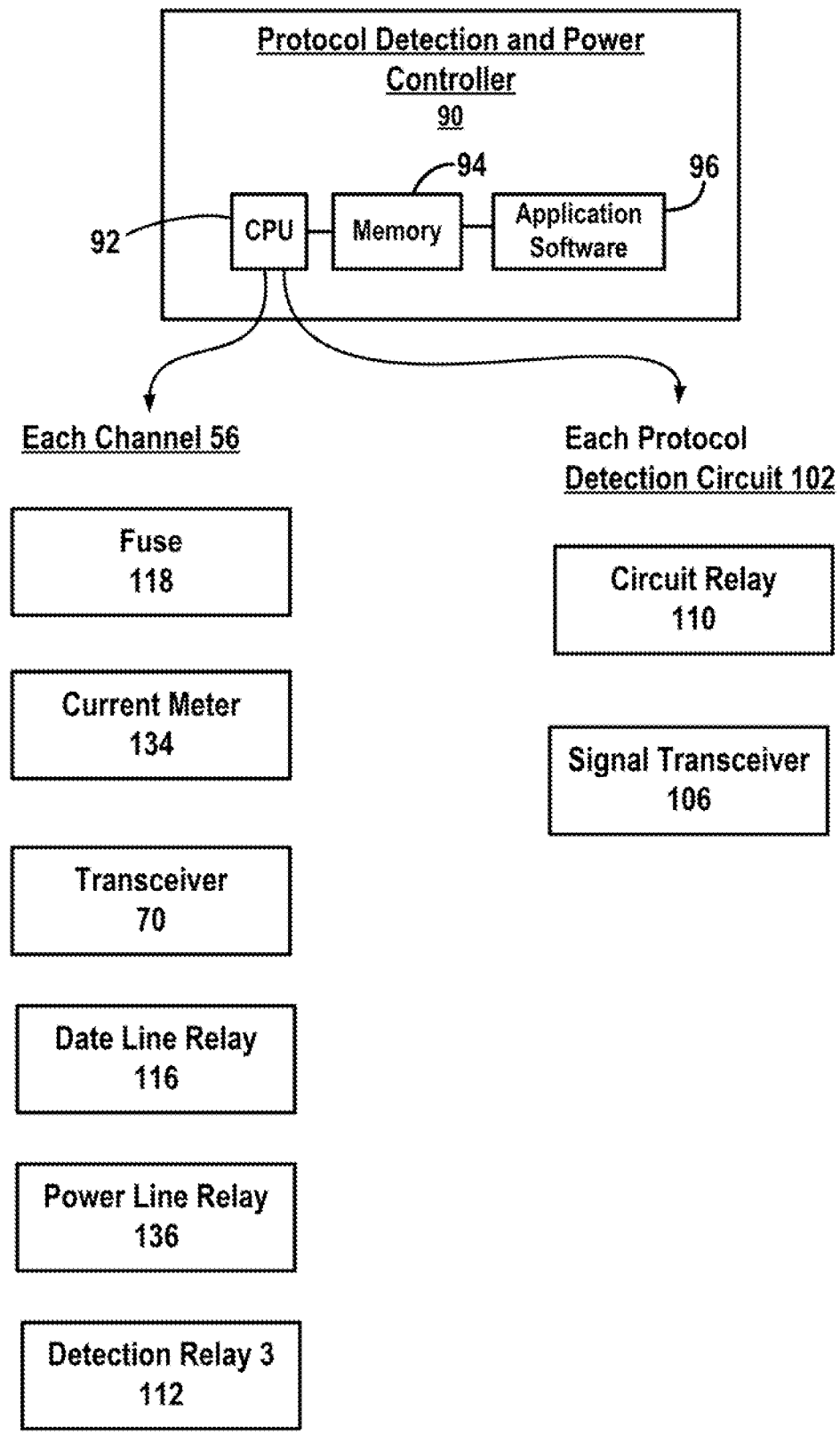
FIG. 14 illustrates the connections of the protocol detection and power controller shown in FIG. 6 to components of each channel and each protocol detection circuit of the APL field switch.

The controller 90 is not only active for protocol detection, but is also be active in setting the ability of a channel 56 to transmit power and, if the channel is transmitting power, in setting the maximum power output of the channel. FIG. 14 summarizes the controller 90 connections to components related to each channel 56 and to each protocol detection circuit 102 for protocol detection and power control.

The controller 90 maintains in memory data related to the installed protocol detection circuits (for example, whether a data-only or power-and-data protocol detection circuit), relays associated with the protocol circuits and with the channels, and the like, and regularly reads the current meters to maintain in-memory state information about each channel, which may include current draw, current-limiting device power state, and the protocol of attached field devices.

When the controller determines a field device has been attached to a channel port, the controller initiates protocol detection to determine the protocol of the attached field device. A stepped current draw (an increase of current flow from zero flow, for example) on any given channel caused by connecting a field device to the channel can be detected by the controller monitoring the channel current meters. A step change in current draw can be used as an interrupt or event that causes the controller 90 to initiate protocol detection of the field device attached to the channel.

Figure 15:
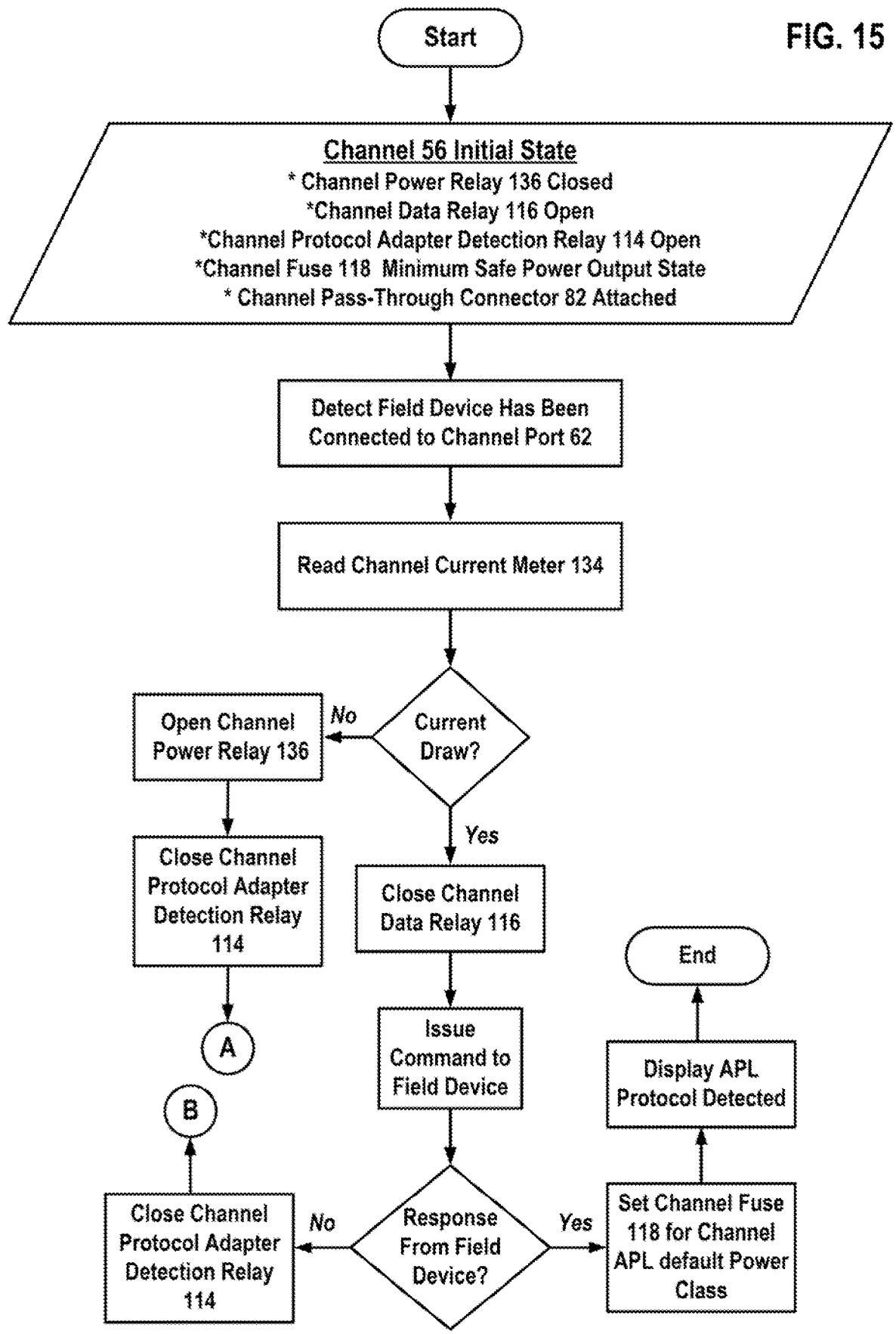
FIGS. 15 and 16 illustrate a flow chart of a method for automatic protocol detection using the automatic protocol detection circuitry shown in FIG. 6.
Figure 16:
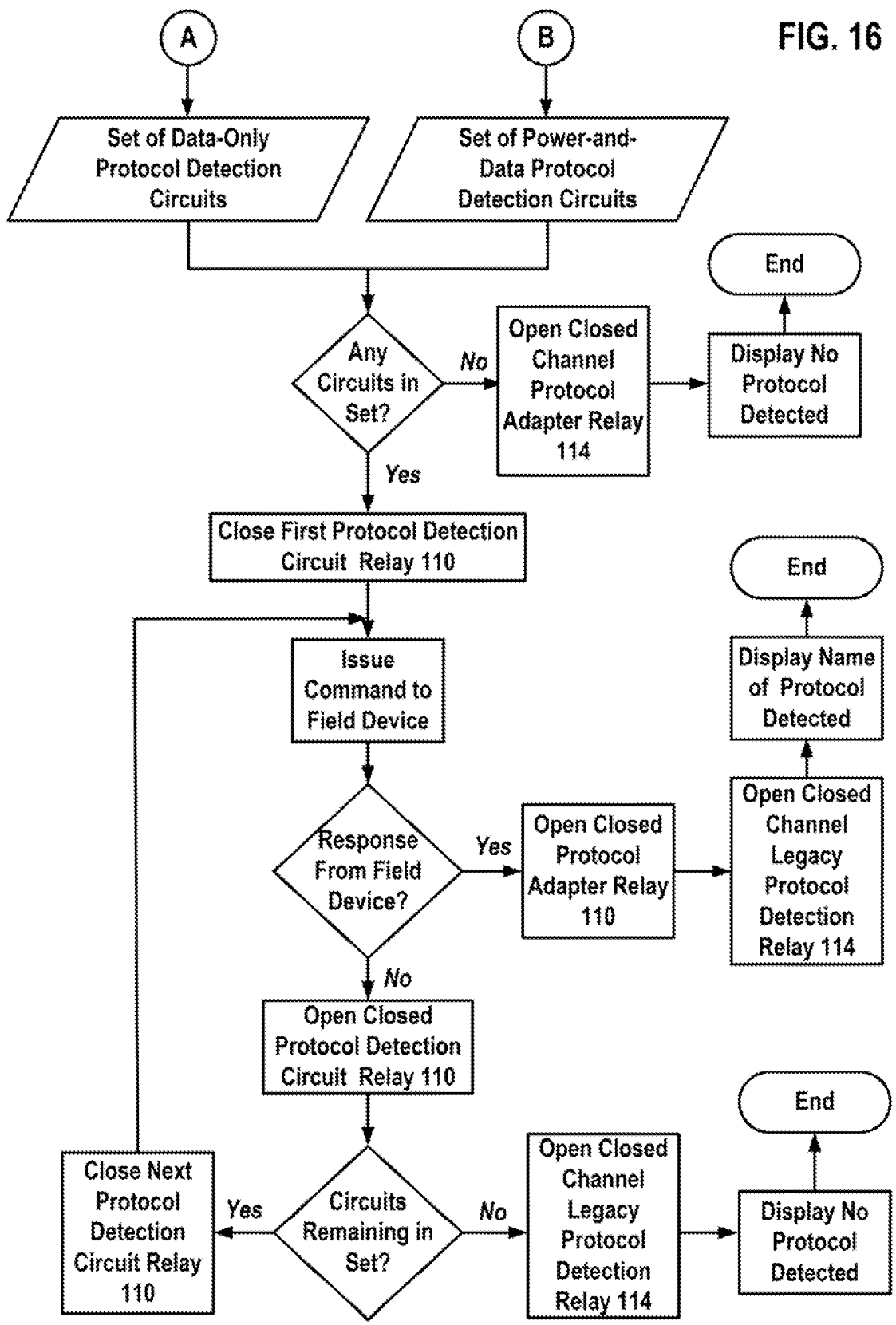

FIGS. 15 and 16 contain a flow chart illustrating the steps that the controller may take in determining the protocol of a field device attached to a channel port 62. The port's channel 56 is in an initial state wherein the channel power relay 136 is closed, the channel data relay 116 is open, and the channel protocol adapter detection relay 114 is open. The channel current-limiting device 118 is in its minimum safe power output state, and the channel pass-through connector 82 is attached.

After detecting the field device has been connected to the channel port 62, the controller reads the channel's current meter 134.

If there is no current draw, the controller 90 has determined the field device is a data-only field device. The controller opens the channel power relay 136 to disconnect the field device from power during protocol detection, and closes the channel's legacy protocol detection relay 114 to enable channel access the data-only protocol detection circuits (if any). The controller checks whether there are data-only protocol detection circuits, and if so, then sequentially closes each data-only protocol detection circuit relay 110 and issues a command to the field device until a response is received from the field device, thereby identifying the protocol of the field device. The controller may save in memory the detected protocol of the channel. The controller then displays the name of the detected protocol. If there are no data-only protocol detection circuits or if no response is received, the controller displays no protocol was detected. The controller opens the channel legacy protocol detection relay 114 to end the protocol detection process.

If there is current draw, the field device is a power-and-data field device. The controller then checks if the field device is an APL field device by closing the channel data relay 116 and issuing a command to the field device. If the field device responds, the controller sets the channel current-limiting device 118 state to that corresponding to the default APL port Power Class and displays that the APL protocol has been detected.

If the attached field device is an APL field device, the field device connection process is complete. The APL field device communicates and receives power through the channel port 62.

If no response is received, the APL field device is a legacy power-and-data field device. The controller attempts to detect the field device protocol as described above for data-only protocols but using only the power-and-data protocol detection circuits. If the protocol is detected, the controller 90 sets the channel current-limiting device state to a power state conforming to the protocol and displays the name of the detected protocol. If no protocol is detected the controller displays no protocol was detected. The controller opens the channel legacy protocol detection relay 114 to end the protocol detection process.

Communications between the controller and field device during protocol detection can be conducted at low speed. The controller 90, the channel 56, and the protocol detection circuits 102 need only the minimum hardware necessary to maintain low speed communications during protocol detection.

If the attached field device is detected to be a legacy non-APL field device, the field device connection process is not yet complete. The user must insert a compatible protocol adapter into the channel's protocol adapter connector to enable data communication between the network trunk 28 and the connected field device. The protocol adapter contains the more expensive legacy hardware required for high-speed data communications with the legacy field device.

The user removes the channel cover 88 and channel pass-through 82 and inserts the protocol adapter into the protocol adapter connecter 72. The protocol adapter is now connected in series with the channel power line 68. The protocol adapter has a data line that converts between APL Ethernet-formatted data and field device formatted data for high speed, two-way data communication between the field device and the network trunk.

Figure 17:
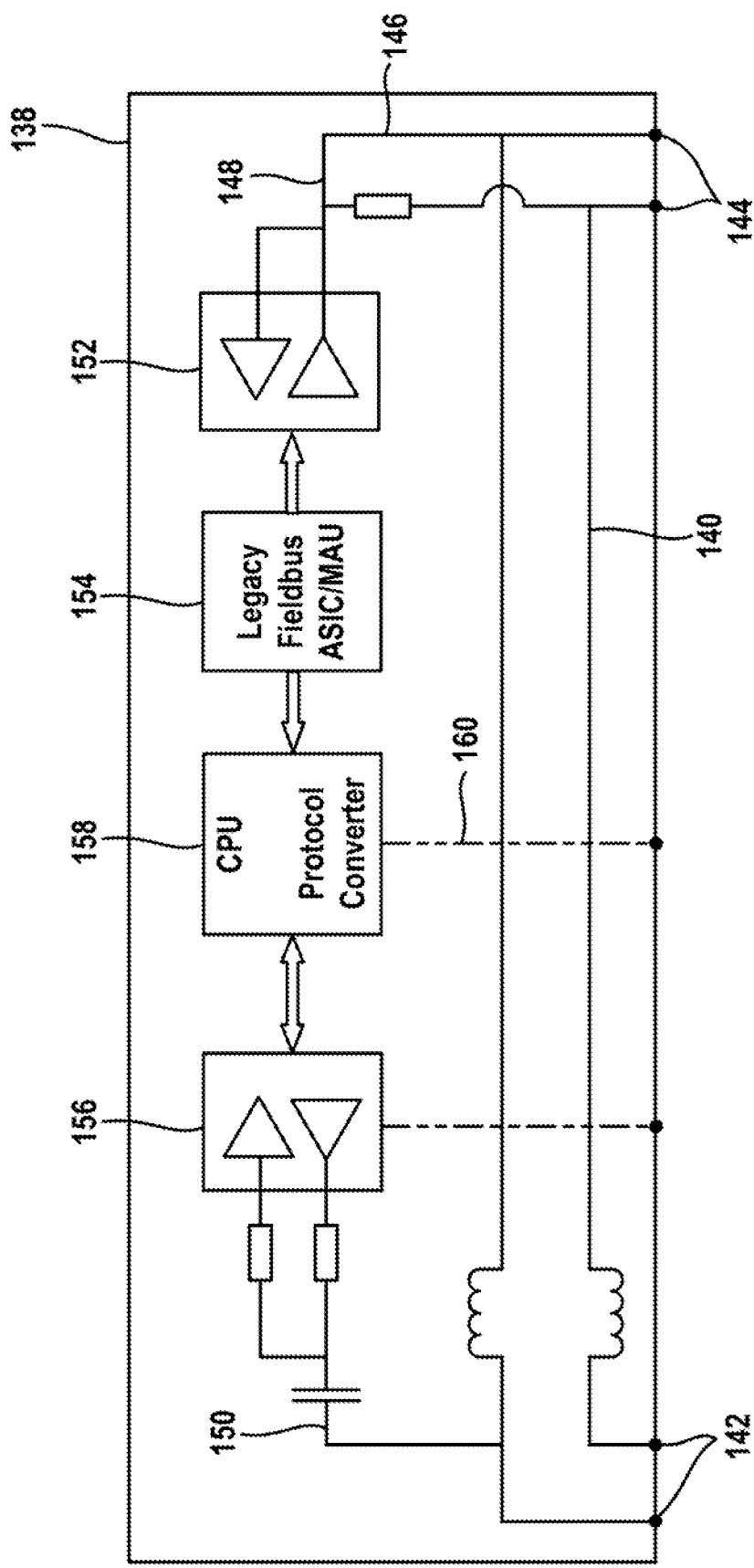
FIG. 17 is a schematic view of a first embodiment protocol adapter configured for connection to the protocol adapter connector shown in FIG. 3.

FIG. 17 illustrates a protocol adapter 138 compatible with a power-and data Profibus PA or Foundation Fieldbus power-and-data field device. The protocol adapter 138 includes a power line 140 having end terminals 142, 144 that connect to the connector terminals 78, 80 and place the power line 140 in series with a channel power line 68 when the adapter is installed in a protocol adapter connector 72. Power transmitted through the protocol adapter is also used to power the protocol adapter.

A data line 146 with opposite ends connected to the adapter power line 140 extends in parallel with the adapter power line and extracts data from and injects data from the adapter power line.

The adapter data line 146 includes a legacy data line segment 148 and an APL data line segment 150 that extend from opposite ends of the channel power line 140. The legacy data line segment 148 extends from the channel port-side of the adapter power segment. The legacy data line segment is connected to a legacy transceiver 152 capable of receiving and transmitting Profibus/FF formatted data. The legacy transceiver 152 is in turn connected to a Fieldbus or Profibus DP ASIC (application-specific integrated circuit) 154 that enables high speed data transmission through the legacy transceiver 152.

The APL data line segment 150 is connected to an APL transceiver 156 that enables high speed data transmission of APL Ethernet formatted data. Disposed between the APL transceiver 156 and the Profibus/FF ASIC 154 is a CPU that functions as a protocol converter 158 that converts the data stream passing through the data line 146 between APL Ethernet and Profibus/FF data formats.

The adapter data line 148 functions to translate APL Ethernet formatted data being transmitted to the field device to Profibus/FF data compatible being transmitted to the field device and functions to translate Profibus/FF formatted data being transmitted from the field device to the APL field switch data terminals to APL Ethernet formatted data being transmitted to the APL field switch data terminals.

The protocol adapter 138 may also include a communications line segment 160 that connects to the controller 90 independently for communication between the controller and the adapter CPU 158 when the protocol adapter is inserted into the protocol adapter connector 72. At power-up the protocol adapter 138 can communicate its presence and its protocol to the controller 90. The controller can verify that the adapter protocol is the same as the detected protocol, and if not, open the channel power relay and warn the user of the protocol mismatch.

Figure 18:
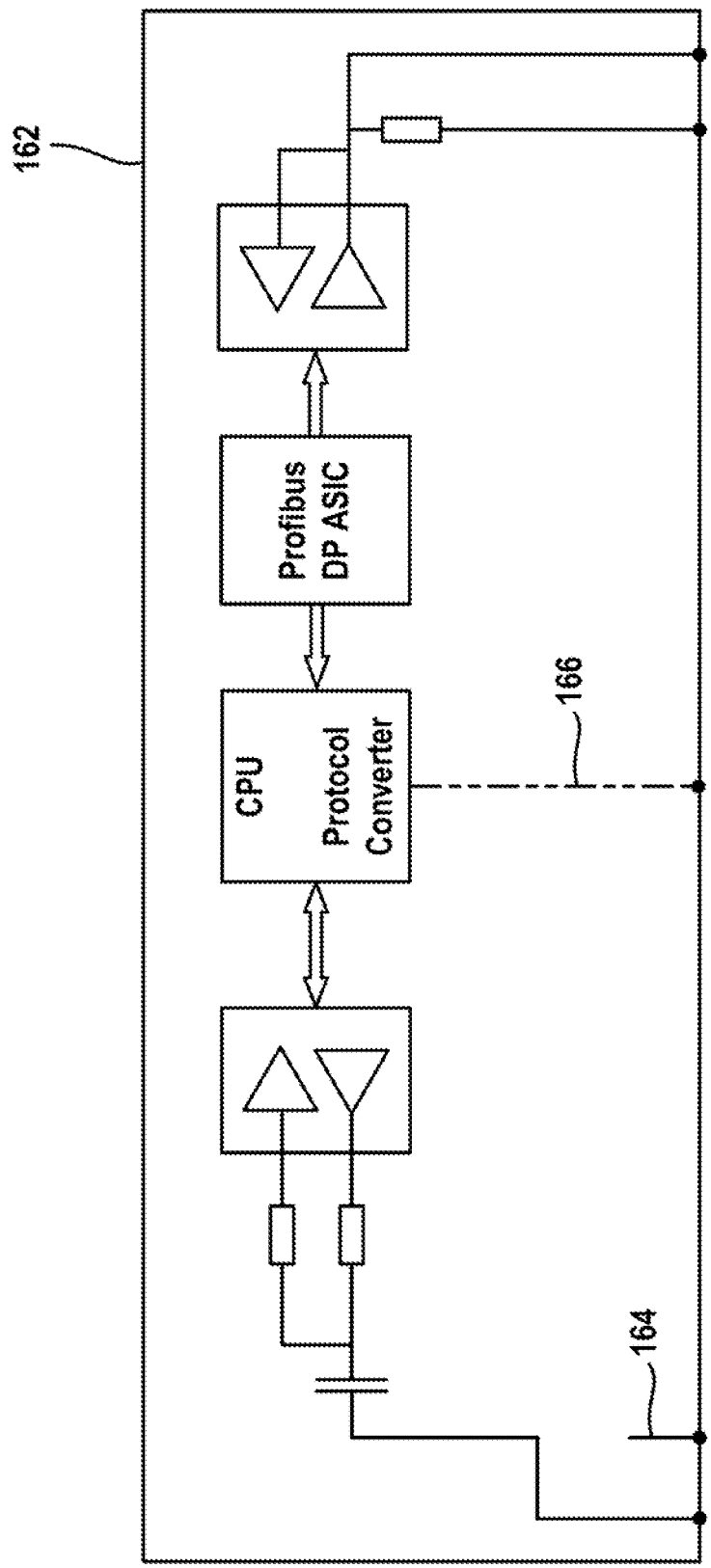
FIG. 18 is a schematic view of a second embodiment protocol adapter configured for connection to the protocol adapter connector shown in FIG. 3.

FIG. 18 illustrates a protocol adapter 162 similar to the protocol adapter 138 but compatible with a data-only Modbus RTU field device. The adapter power line 164 does not transmit power through the power adapter but instead is configured to draw power from the channel power line 68 to power the protocol adapter only.

The illustrated protocol adapter 162 includes a communications line segment 166. When the protocol adapter 162 is installed in the protocol adapter connector 72, the controller 90 detects the connection to the communications line segment 160 and opens the channel power line 68 to power the installed protocol adapter 162. The protocol adapter 162 can then communicate its presence to the controller for protocol verification as discussed with respect to the power-and-data protocol adapter 138.

Figure 19:
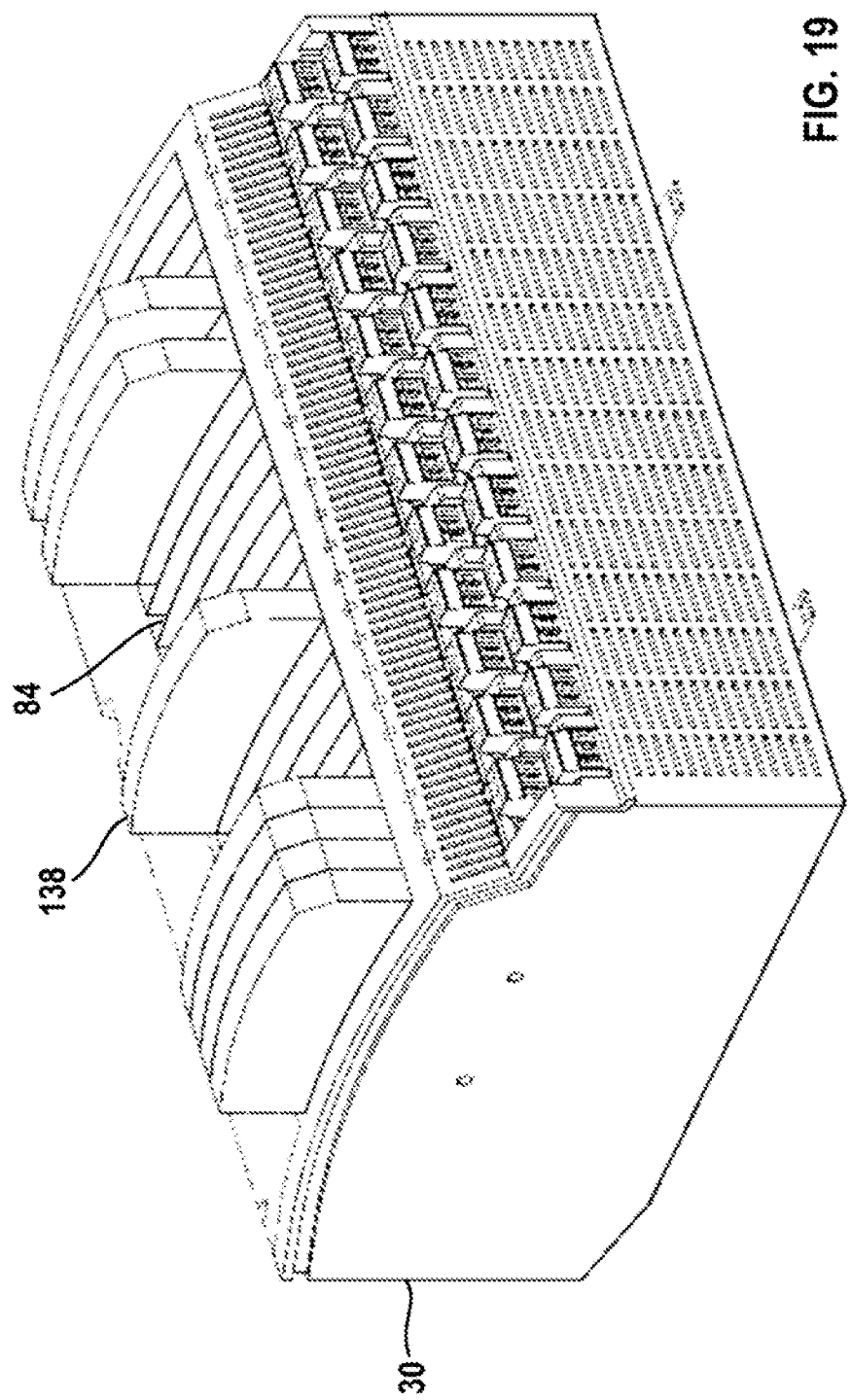
FIG. 19 illustrates the APL field switch with the covers removed and protocol adapters attached in some of the channels of the APL field switch.

FIG. 19 illustrates the APL field switch 30 having a number of installed protocol adapters 138 (spur lines and field devices are not shown).

Figure 20:
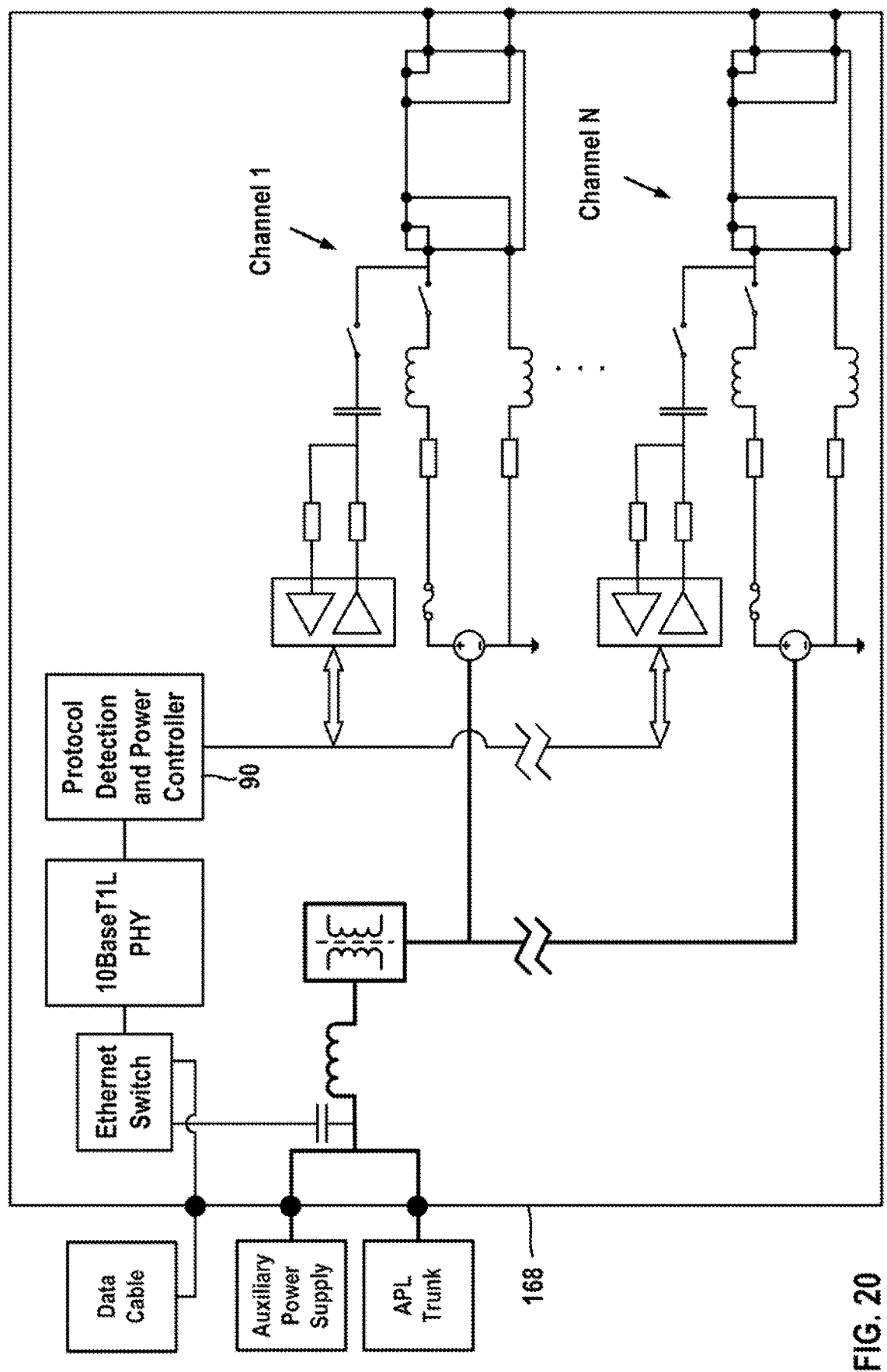
FIG. 20 illustrates a second embodiment APL field switch in accordance with this disclosure.

FIG. 20 illustrates a second embodiment APL field switch 168. The APL field switch 168 is similar to the APL field switch 30 includes no protocol detection circuits to detect the protocol of a field device when the field device is first connected to a channel port. Current meters can be eliminated. When attaching a non-APL field device to a port channel, a user is responsible for inserting a compatible protocol adapter such as a protocol adapter 138 or a protocol adapter 162 in the channel's protocol adapter connector 72 to complete connection of the field device to the APL field switch. A protocol adapter can include a communications line segment as previously described to communicate its presence and protocol to the controller to enable the controller 90 to set the proper power state of the channel current-limiting device based on the protocol.

When attaching an APL field device to a port channel with the power adapter pass-through 82 installed, the APL field device 168 detects the field device connection, can determine there is no protocol adapter in place, can confirm the installation of an APL field device, and can then set the channel current-limiting device power state to that associated with the default Power Class of the port.

Figure 22:
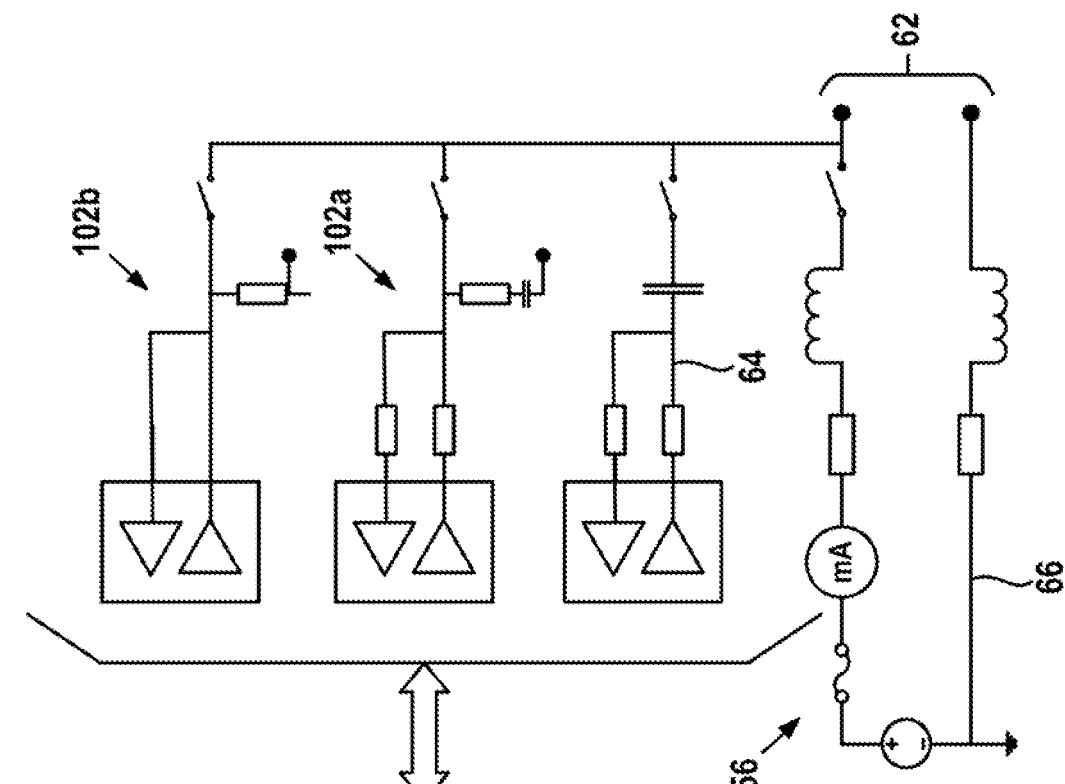
FIG. 22 is a schematic view of the protocol detection circuitry contained in the protocol detection unit shown in FIG. 21.
Figure 21:
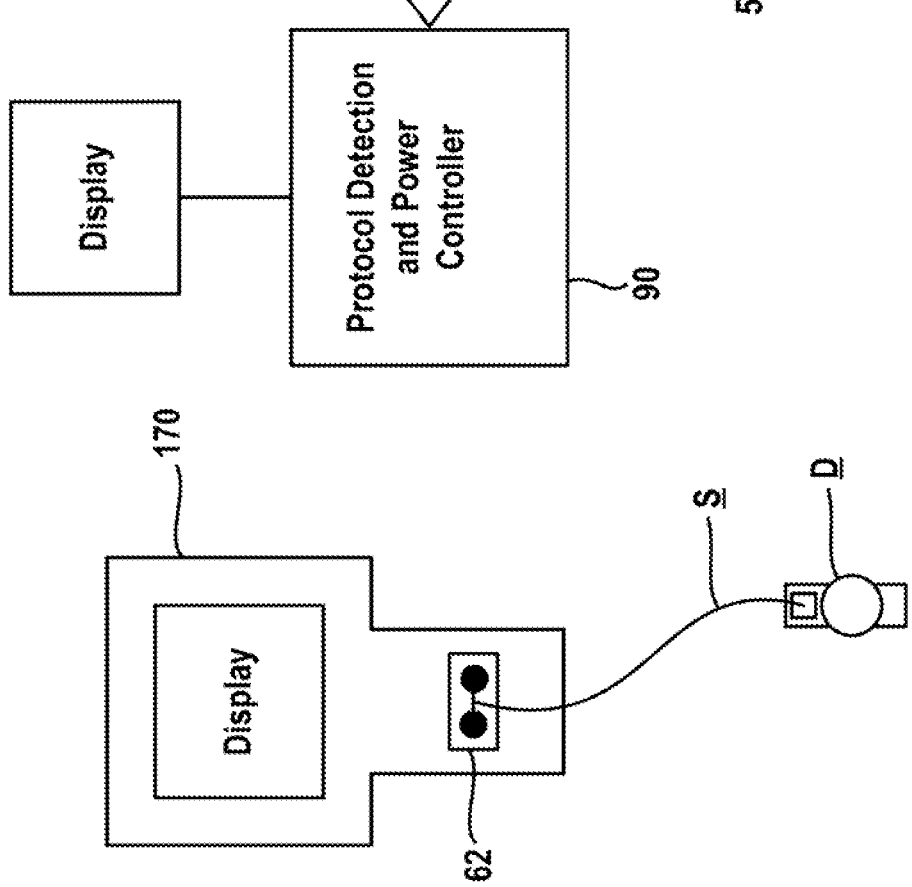
FIG. 21 illustrates a handheld protocol detection unit attached to a field device.

When using an APL field switch 168, a user may wish to utilize protocol detection to identify or verify the protocol of a field device before attaching the field device to the APL field switch. FIG. 21 illustrates a battery-powered handheld protocol detection tool 170 containing the protocol detection circuitry shown in FIG. 22. The detection tool contains selectably connectable protocol detection circuits 102 like the protocol detection circuits 102 in the APL field switch 32. The protocol detection circuits 102 are connected to an APL channel 56 like the channel 56 in the APL field switch 32 but extending continuously without a protocol adapter connector to a two-wire port 62. The tool has a controller 90 that determines the field device as previously described for the APL field switch 30.

Figure 12:
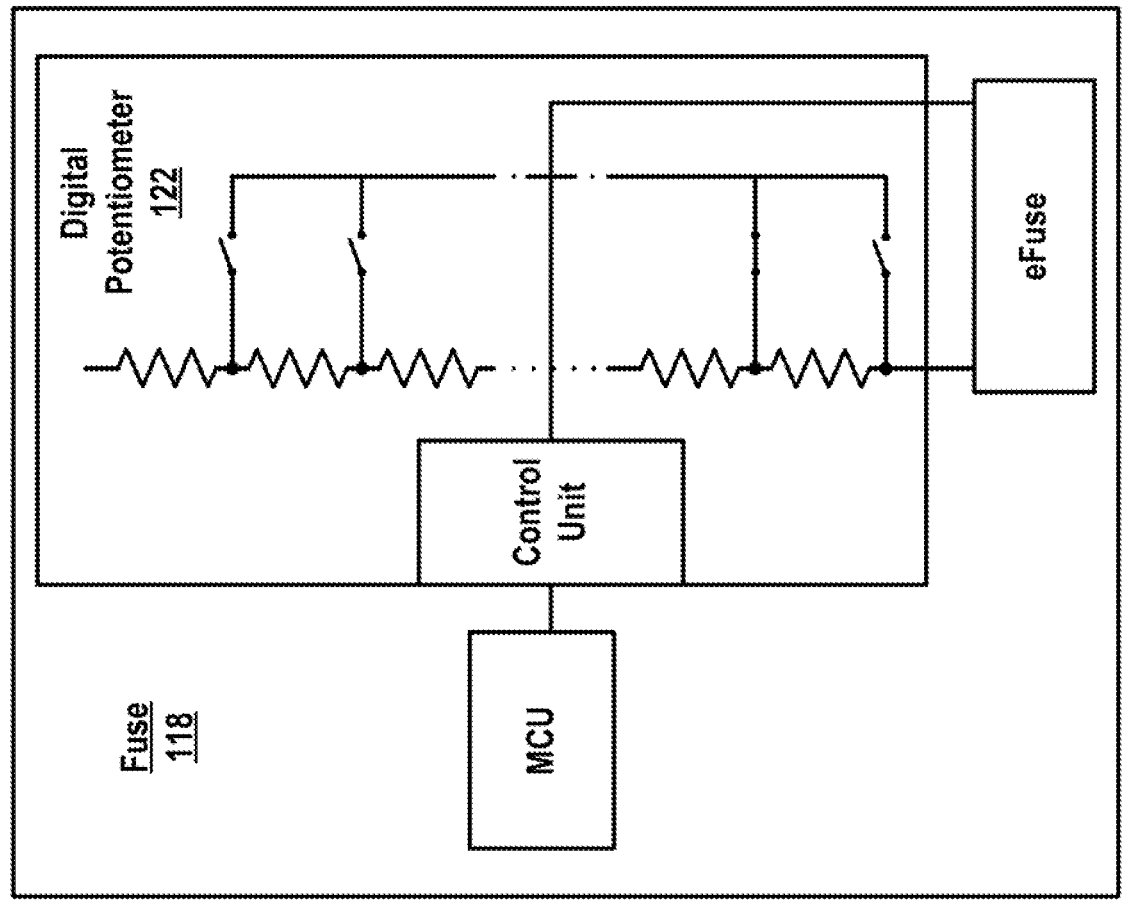
FIG. 12 is similar to FIG. 11 but the current-limiting device in a second, lower power state.

A user connects the field device D to the port 62 using a two-wire spur S. The tool controller 90 goes through its protocol detection routine as shown in FIGS. 12 and 13. The protocol detection result can be displayed on the tool display and/or reported via wired or wireless connection to a smartphone, tablet, computer, or the like.

A relay in accordance with this disclosure can be an analog relay, a transistor relay, a mechanical relay, or equivalent. A data line being an electrical conductor can transmit data, including commands and responses, as an electrical signal compliant with the field device protocol in which the data line receives the data.

While this disclosure includes one or more illustrative embodiments described in detail, it is understood that the one or more embodiments are each capable of modification and that the scope of this disclosure is not limited to the precise details set forth herein but include such modifications that would be obvious to a person of ordinary skill in the relevant art including (but not limited to) changes in material selection, size, number of protocol detection circuits, field device protocols associated with the protocol detection circuits, and the like, as well as such changes and alterations that fall within the purview of the following claims.

The invention claimed is:

1. A method for automatic protocol detection of a field device for a process control network in response to the field device being attached to a port of a field switch of the process control network, the field switch comprising a plurality of ports and a plurality of channels, each port of the plurality of ports being connected to a respective channel of the plurality of channels, each individual port of the plurality of ports configured to connect a field device connected to the port to the respective channel connected to the individual port, each individual channel of the plurality of channels configured to transmit data between the individual port connected to the individual channel and the network, the field switch comprising a set of one or more protocol detection circuits, each protocol detection circuit of the set of one or more protocol detection circuits being compatible with a respective field device protocol different from the field device protocols of the other protocol detection circuits of the set of one or more protocol detection circuits, and each protocol detection circuit of the set of one or more protocol detection circuits configured to transmit data to and receiving data from the individual port connected to an individual channel of the plurality of channels when the protocol detection circuit is connected to the individual channel, the set of one or more protocol detection circuits not being connected directly to any one channel of the plurality of channels at the start of the method, the method comprising the steps of:

(a) attaching a field device to a port of the plurality of ports of the field switch and thereby connecting the field device with the channel of the plurality of channels connected to the said port;

(b) in response to step (a), connecting a first protocol detection circuit of the set of one or more protocol detection circuits to the channel of the plurality of channels that is connected to the port attached to the field device and thereby connecting the channel with the field device while maintaining the other protocol detection circuits disconnected from the channel connected to the field device;

(c) attempting to communicate with the attached field device through the protocol detection circuit connected to the attached field device using the protocol of the protocol detection circuit connected to the field device;

(d) if step (c) is successful in communicating with the attached field device identify the field device as having a protocol associated with the protocol detection circuit connected to the field device and then performing steps (e) and (f):

(e) disconnecting the protocol detection circuit attached to the field device from the channel connected to the field device; and (f) ending the method;

(g) if step (c) is not successful in communicating with the attached field device, proceed with the steps of:

(h) disconnecting the protocol detection circuit connected to the field device from the channel connected to the field device;

(i) determining whether there are remaining protocol detection circuits in the set of one or more protocol detection circuits that have not been connected to the channel connected to the field device;

(j) if step (h) (i) determines there are no remaining protocol detection circuits that have not been connected to the channel connected to the field device, performing the steps (k) and (l):

(k) identifying the field device as having an unidentified protocol; and (l) ending the method; and (m) if step (i) determines there are one or more protocol detection circuits that have not been connected to the channel, repeating the method starting at step (b) with a next protocol detection circuit of the set of one or more protocol detection circuits that has not been connected to the channel connected to the field device as the first protocol detection circuit of step (b), whereby at the end of the method all the protocol detection circuits of the set of one or more protocol detection circuits are disconnected from the plurality of channels.

2. The method of claim 1 wherein step (c) comprises the steps of:

(n) transmitting a command to the field device through the protocol detection circuit connected to the field device; and (o) determining whether the field device responded to the command or did not respond to the command.

3. The method of claim 1 wherein the channel connected to the field device comprises a power line connected to the port connected to the field device whereby the field device receives power through the power line when connected to the channel, and step (a) comprises the steps of:

(n) in response to attaching the field device to the port, determining whether the field device is drawing power through the channel power line before connecting the first protocol circuit to the channel;

(o) if step (n) determines the field device is not drawing power through the channel power line, when performing step (b) connecting to the channel connected to the field device only those protocol detection circuits of the set of one or more protocol detection circuits that are associated with data-only protocols; and (p) if step (n) determines the field device is drawing power through the channel power line, when performing step (b) connecting to the channel connected to the field device only those protocol detection circuits of the set of one or more protocol detection circuits that are associated with data-and-power protocols.

4. The method of claim 1 wherein the channel connected to the field device comprises a power line whereby the field device can receive power through the power line when connected to the channel, and step (a) comprises the steps of:

(n) in response to attaching the field device to the port, determining whether the field device is drawing power through the channel power line before connecting the first protocol circuit to the channel connected to the field device;

(o) if step (n) determines the field device is not drawing power, opening the power line to prevent power from being transmitted through the channel power line to the field device while the field device is attached to the port.

5. The method of claim 1 wherein the channel connected to the port comprises a power line whereby the connected field device can receive power through the power line when connected to the channel, and step (a) comprises the steps of:

(n) in response to attaching the field device to the port, determining whether the field device is drawing power through the channel power line before connecting the first protocol circuit to the channel;

(o) if step (n) determines the field device is drawing power, limiting the power transmitted through the channel power line to a minimum safe power for protection of the attached field device while attempting to determine the protocol of the field device.

6. The method of claim 5 wherein step (f) comprises the step of:
(p) before ending the method, increasing the power transmitted to the field device through the power line to at most the maximum power permitted by the identified protocol.

7. The method of claim 1 wherein the one or more protocol detection circuits are each selectively connected and disconnected with each channel of the plurality of channels, and each protocol detection circuit comprises a normally open first relay, and step (b) comprises the step of:
(n) closing the first relay of the first protocol detection circuit as part of connecting the first protocol detection circuit to the channel connected to the field device; and
step (e) comprises the step of:
(o) opening the first relay closed in step (n) as part of disconnecting the protocol detection circuit connected to the field device from the channel connected to the field device.

8. The method of claim 7 wherein each channel of the plurality of channels is configured to transmit data through the channel compatible with a channel protocol not associated with the protocol of any one protocol detection circuit of the set of one or more protocol detection circuits;
each individual channel of the plurality of channels comprises a data line being configured to transmit data through the individual channel using the channel protocol;
the data line of each channel of the plurality of channels comprises a respective second relay in the data line; and
step (b) comprises the steps of:
(p) transmit ting data using the channel protocol through the data line of the channel while maintaining the second relay in the data line of the channel in a closed state and all the first relays in the set of one or more protocol detection circuits in an open state to determine whether the field device is compatible with the channel protocol;
(q) if step (p) determines the field device is compatible with the channel protocol, identify the field device as having the channel protocol and terminate step (a) to end the method while maintaining the second relay in the data line of the channel in the closed state;
(r) if step (p) determines the field device is not compatible with the channel protocol, opening the second relay in the data line of the channel connected to the field device and maintaining the second relay in the opened state throughout the remainder of the method.

9. The method of claim 8 wherein step (f) further comprises, before ending the method, the steps of:
(s) attaching a protocol adapter compatible with the identified protocol in a protocol adapter connector disposed in the channel, the protocol adapter being configured to translate between the identified protocol and the channel protocol.

10. The method of claim 7 wherein each individual protocol detection circuit of the set of one or more protocol detection circuits is connected in parallel with each individual channel of the plurality of channels by respective channel data lines extending from the individual protocol detection circuit to each respective individual channel, each channel data line comprising a normally open respective third relay in the channel data line, and step (b) further comprises the step of:
(p) closing the normally open third relay in the channel data line extending from the first protocol circuit to the channel connected to the field device as part of connecting the first protocol detection circuit to the channel connected to the field device; and
steps (f) and (l) each comprise the step of:
(q) as part of ending the method, opening the third relay closed in step (p) and thereby disconnecting the channel from all the protocol detection circuits of the set of one or more protocol detection circuits.

11. The method of claim 10 wherein the set of one or more protocol detection circuits comprises a set of two or more protocol detection circuits and step (m) comprises the step of:
(r) maintaining the closed third relay in the closed state while repeating the method with the next protocol detection circuit.

12. The method of claim 1 wherein each channel of the plurality of channels is configured to transmit data compatible with a channel protocol not associated with any one protocol of the set of one or more protocol detection circuits; and
step (b) comprises the steps of:
(n) before connecting the first protocol detection circuit to the channel, determining whether the field device is compatible with the channel protocol;
(o) if step (n) determines the field device is compatible with the channel protocol, identify the field device as having the channel protocol and terminate step (b) to end the method; and
(p) if step (o) determines the field device is not compatible with the channel protocol, continue with the remainder of step (b) by connecting the first protocol detection circuit with the channel.

13. The method of claim 12 wherein each channel of the plurality of channels comprises a respective protocol adapter connector, the protocol adapter connector configured to receive a protocol adapter that, when attached to the protocol adapter connector, converts data transmitted through the protocol adapter connecter connector between the channel protocol and a field device protocol different than the channel protocol; and
step (f) comprises the step of:
(q) before ending the method, attaching a protocol adapter compatible with the identified field device protocol to the protocol adapter connector of the channel connected to the port.

14. The method of claim 13 wherein the protocol adapter connector of each channel of the plurality of channels normally opens the channel; and
step (b) comprises the step of:
(r) before performing step (n), providing electrical continuity across the protocol adapter connector of the channel connected to the field device.

15. The method of claim 13 wherein:
step (r) comprises attaching a pass-through connector to the protocol adapter connector of the channel connected to the field device, the attached pass-through connector providing channel continuity across the protocol adapter connector; and
step (q) comprises, prior to attaching the protocol adapter to the protocol adapter connector, removing the pass-through connector attached to the protocol adapter connector in step (q) from the protocol adapter connector.

16. The method of claim 14 wherein the field switch comprises a plurality of slots, each slot being open to a respective protocol adapter connector of the plurality of channels to receive a protocol adapter into the slot;
   step (r) comprises attaching a cover to the field switch closing the slot open to the protocol adapter connector of the channel connected to the port, the cover when attached to the field switch providing channel continuity across the protocol adapter connector; and
   step (q) comprises removing the cover from the field device to open the slot prior to attaching the protocol adapter to the protocol adapter connector.

17. The method of claim 12 wherein the channel protocol of each channel of the plurality of channels is compatible with the Ethernet Advanced Physical Layer (APL) specification.

18. The method of claim 1 wherein the field switch can transmit power through the plurality of channels to respective field devices connected to the channels of the plurality of channels, and step (a) comprises the steps of:
   (n) detecting a start of power transmission through a channel of the plurality of channels to detect the field device has been connected to the channel starting power transmission; and
   (o) initiating step (b) in response to detecting the connection of the field device to the channel starting power transmission.

19. The method of claim 1 wherein the field switch comprises a controller connected to each channel of the plurality of channels and to each protocol detection circuit of the set of one or more protocol detection circuits, the controller being configured to execute stored instructions to perform the method of detecting the protocol of the field device.

20. The method of claim 19 wherein step (d) comprises the controller generating an output signal used to identify to a user of the field switch the identified protocol of the field device.

21. A field switch for connecting a plurality of field devices to a process control network connected to the field switch, the field switch comprising:
   one or more terminals for connecting the field switch to the process control network, the one or more terminals being configured to enable the field switch to receive power into the field switch and to receive data into the field switch and to transmit data from the field switch to the process control network;
   a plurality of channels for transmitting data and power between the one or more terminals and any one of the field devices connected to the channels, each individual channel comprising a respective port being configured to connect a field device to the individual channel, the individual channel configured to transmit data to and from a field device attached to the port of the individual channel;
   a set of one or more protocol detection circuits being the sole one protocol detection circuit or the sole set of more than one protocol detection circuits of the field device, each protocol detection circuit of the set of one or more protocol detection circuits being compatible with a respective field device protocol different from the field device protocols of each other protocol detection circuit of the set of one or more protocol detection circuits;
   each individual protocol detection circuit of the set of one or more protocol detection circuits selectively connectable to each respective individual channel of the plurality of channels, the individual protocol detection circuit configured to transmit data to and receiving data from the port of the connected individual channel using the protocol associated with the individual protocol detection circuit when connected to the individual channel;
   a controller comprising a microprocessor configured to execute instructions stored in non-volatile memory for performing protocol detection, the controller being connected to each protocol detection circuit of the set of one or more protocol detection circuits, the controller configured to selectively connect and disconnect each individual protocol detection circuit of the set of protocol detection circuits to each individual channel of the plurality of the channels; and
   the controller configured to sequentially connect each individual protocol detection circuit of the set of one or more protocol detection circuits to an individual channel of the plurality of channels when a field device is connected to the port of the individual channel and determining whether or not the protocol of the field device is identified using the protocol detection circuits of the set of one or more protocol detection circuits; and
   the controller configured to disconnect all the protocol detection circuits of the set of one or more protocol detection circuits from the individual channel after determining whether or not the protocol of the field device connected to the port of the individual channel can be identified using the set of one or more protocol detection circuits and thereby enabling the set of one or more protocol detection circuits to be used in identifying the protocol of a next field device connected to a channel other than the individual channel of the plurality of channels of the field switch.

22. The field switch of claim 21 wherein the field switch is configured to connect to a process control network utilizing a network protocol and each channel of the plurality of channels comprises a respective protocol adapter connector disposed in the respective channel in series with the port of the respective channel, the respective protocol adapter connector configured to removably receive a protocol adapter of the type that converts between the network protocol and a different protocol to enable a field device using the different protocol and connected to the channel in which the respective protocol adapter is disposed to communicate through the process control network, thereby enabling field devices having protocols incompatible with the protocol of the process control network and connected to the field switch to be used on the process control network.

23. The field switch of claim 22 wherein the respective protocol adapter connector disposed in a respective channel of the plurality of channels normally opens the individual channel, and the respective protocol adapter connector is configured to removably attach a pass-through connector into the individual channel, the pass-through connector providing electrical continuity for power and data across the respective protocol adapter connector and thereby closing the individual channel and enabling power and data transfer across the pass-through connector when attached to the respective protocol adapter connector.

24. The field switch of claim 23 wherein the field switch comprises a plurality of slots, each respective slot of the plurality of slots being open to a respective protocol adapter connector to receive the respective protocol adapter into the respective slot;

and the pass-through connector is configured as an attachable cover to the field switch to close a respective slot of the plurality of slots, the cover when closing a respective slot of the plurality of slots providing electrical continuity across the protocol adapter connector being disposed in the respective slot.

25. The field switch of claim 22 wherein the controller, upon identifying the protocol of a field device connected to a port of a respective channel of the plurality of channels, is configured to generate and transmit data used to inform a user of the protocol of the connected field device.

26. The field switch of claim 21 wherein each individual protocol detection circuit of the set of one or more protocol detection circuits comprises a respective normally open first relay disposed in the individual protocol detection circuit, the first relays of the set of one or more protocol detection circuits being operatively connected to the controller and enabling the controller to selectively open and close the first relays when attempting to identify the protocol of a connected field device.

27. The field switch of claim 26 wherein the field switch is configured to connect to a process control network utilizing a network protocol different from any one of the protocols of the set of one or more protocol detection circuits;

each channel of the plurality of channels is connected to the controller;

each channel of the plurality of channels comprises a respective second relay in the channel, the second relays of the plurality of channels being operatively connected to the controller wherein the controller can selectively open and close the second relays; and the controller when attempting to identify the protocol of a field device attached to a respective channel of the plurality of channels is configured to initially close the second relay of the respective channel and open all of the first relays whereby the set of one or more protocol detection circuits is not connected to the attached field device and the controller is connected to the attached field device.

28. The field switch of claim 27 wherein the controller when attempting to identify the protocol of a field device attached to a respective channel of the plurality of channels is configured to maintain the second relay of the respective channel in an open state if the attached field device is not compatible with the network protocol.

29. The field switch of claim 27 wherein the controller when attempting to identify the protocol of a field device attached to a respective channel of the plurality of channels is configured to maintain the second relay of the respective channel in a closed state while the field device is attached to the channel after determining the field device is compatible with the network protocol.

30. The field switch of claim 26 wherein each respective protocol detection circuit of the set of one or more protocol detection circuits is connected to each individual channel of the plurality of channels by a respective channel data line extending from the respective protocol detection circuit to the individual channel;

each of the respective channel data lines comprises a respective third switch disposed in the channel data line, the third switches of the channel data lines being operatively connected to the controller wherein the controller can selectively open and close the third relays when the controller is attempting to identify the protocol of connected field devices; and the controller while attempting to identify the protocol of a field device attached to a channel of the plurality of channels is configured to maintain the third relay of the channel data line extending from the channel attached to the field device in the closed state and maintain the other third relays in an open state.

31. The field switch of claim 30 wherein the set of one or more protocol detection circuits is a set of two or more protocol detection circuits;

the protocol detection circuits of the set of two or more protocol detection circuits are connected together to a common data line; and the channel data lines extending from the plurality of channels are connected to the common data line.

32. The field switch of claim 21 wherein each individual channel of the plurality of channels configured to transmit power through the individual channel to a field device connected to the individual channel;

each individual channel of the plurality of channels comprises a power limiting device that can selectively limit the power transmitted from the individual channel to a field device attached to the individual channel, the power limiting device operatively connected to the controller wherein the controller can selectively limit the power transmitted to a field device attached to the individual channel; and the controller is configured to detect power being transmitted to a field device attached to the port of an individual channel of the plurality of channels and is configured to limit power being transmitted to the field device through the individual channel by operation of the power limiting device of the individual channel to a minimum safe power while the controller is attempting to determine the protocol of the field device attached to the port of the individual channel.

33. The field switch of claim 32 wherein the controller is configured to increase the power transmitted to the field device attached to the port of the individual channel through the individual channel after determining the protocol of the field device whereby the power transmitted to the attached field device is at most the maximum power allowed by the protocol of the field device.

34. The field switch of claim 21 wherein the controller is configured to detect the start of power being transmitted to a field device attached to the port of any one individual channel of the plurality of channels, and to initiate an attempt to identify the protocol of the attached field device in response thereto.

35. The field switch of claim 21 wherein the controller, upon identifying the protocol of a field device connected to a port of an individual channel of the plurality of channels of the field switch, is configured to generate and transmit data used to inform a user of the identified protocol of the field device.

36. The field switch of claim 21 wherein the controller, upon failing to identify the protocol of a field device connected to a port of an individual channel of the plurality of channels of the field switch, is configured to generate and transmit data used to inform a user of the failure to identify the protocol of the field device.

37. The field switch of claim 21 wherein each respective channel of the plurality of channels comprises a respective power line that transmits power through the respective channel to a power-and-data field device attached to the respective channel;

each channel of the plurality of channels includes a respective relay in the power line of the channel, the relays of the plurality of channels being operatively connected to the controller and enabling the controller to selectively open and close each of the respective relays; and the controller being configured to maintain the relay of an individual channel of the plurality of channels in an opened state if the controller determines that a data-only field device and not a power-and-data field device is attached to the port of the individual channel.

* * * * *